United States Patent
Zhang

(10) Patent No.: US 10,915,412 B2
(45) Date of Patent: Feb. 9, 2021

(54) SYSTEM AND METHOD FOR LIVE MIGRATION OF A VIRTUAL MACHINE

(71) Applicant: ALIBABA GROUP HOLDING LIMITED, Grand Cayman (KY)

(72) Inventor: Chao Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 110 days.

(21) Appl. No.: 16/294,876

(22) Filed: Mar. 6, 2019

(65) Prior Publication Data

US 2019/0205220 A1 Jul. 4, 2019

Related U.S. Application Data

(63) Continuation of application No. PCT/CN2017/099988, filed on Aug. 31, 2017.

(30) Foreign Application Priority Data

Sep. 6, 2016 (CN) .......................... 2016 1 0806408

(51) Int. Cl.
*G06F 11/07* (2006.01)
*G06F 11/14* (2006.01)
(Continued)

(52) U.S. Cl.
CPC ............ *G06F 11/1469* (2013.01); *G06F 8/60* (2013.01); *G06F 9/45558* (2013.01);
(Continued)

(58) Field of Classification Search
CPC ........................... G06F 11/2023; G06F 11/203
(Continued)

(56) References Cited

U.S. PATENT DOCUMENTS

2014/0215172 A1* 7/2014 Tsirkin .................. G06F 11/203
711/162
2015/0324236 A1* 11/2015 Gopalan ............... G06F 9/5088
711/162

(Continued)

FOREIGN PATENT DOCUMENTS

CN 103201721 A 7/2013
CN 105335223 A 2/2016
(Continued)

OTHER PUBLICATIONS

Hines, Michael R. et al., "Post-Copy Live Migration of Virtual Machines," ACM SIGOPS Operating Systems Reivew, Jul. 31, 2019, 13 pages.
(Continued)

*Primary Examiner* — Chae M Ko
(74) *Attorney, Agent, or Firm* — Finnegan, Henderson, Farabow, Garrett & Dunner, LLP

(57) ABSTRACT

Systems and methods for live migration of a virtual machine are provided. The methods include: copying, by a destination physical machine according to a recorded dirty page table, dirty memory pages corresponding to dirty memory page identifiers in the dirty page table to a source physical machine when live migration of a virtual machine fails in a delayed-copy mode, and updating and storing, by the source physical machine, the copied dirty memory pages. When live migration of a virtual machine fails, dirty memory pages corresponding to dirty memory page identifiers in a dirty page table are copied to a source physical machine to be updated and stored, so that the source physical machine has complete and the latest memory pages, and the virtual machine can roll back to and run independently on the source physical machine.

30 Claims, 23 Drawing Sheets

(51) Int. Cl.
*G06F 8/60* (2018.01)
*G06F 9/455* (2018.01)

(52) U.S. Cl.
CPC ...... *G06F 11/07* (2013.01); *G06F 2009/4557* (2013.01); *G06F 2009/45583* (2013.01); *G06F 2009/45587* (2013.01); *G06F 2201/82* (2013.01)

(58) Field of Classification Search
USPC ............................ 714/18, 19, 4.11, 4.12, 6.3
See application file for complete search history.

(56) References Cited

U.S. PATENT DOCUMENTS

| 2017/0046185 A1* | 2/2017 | Tsirkin | G06F 9/45558 |
| 2017/0357527 A1* | 12/2017 | Srinivas | G06F 9/45558 |
| 2018/0373553 A1* | 12/2018 | Connor | G06F 9/45558 |

FOREIGN PATENT DOCUMENTS

| CN | 103955399 A | 7/2017 |
| WO | WO 2018/045908 A1 | 3/2018 |

OTHER PUBLICATIONS

PCT International Search Report issued in International Application No. PCT/CN2017/099988, dated Nov. 30, 2017 (7 pages).

\* cited by examiner

SYSTEM AND METHOD FOR LIVE MIGRATION OF A VIRTUAL MACHINE

CROSS-REFERENCE TO RELATED APPLICATION

The present disclosure claims the benefits of priority to International Application No. PCT/CN2017/099988, filed Aug. 31, 2017, which claims priority to Chinese Patent Application 201610806408.7, filed on Sep. 6, 2016, both of which are incorporated herein by reference in their entireties.

TECHNICAL FIELD

The present disclosure relates to the field of communication technologies, and particularly to methods and systems for live migration rollback of a virtual machine.

BACKGROUND

Live migration of a virtual machine (VM) is a key technology in cloud computing. Live migration refers to a migrating a running virtual machine from one physical machine to another physical machine. It allows dynamic scheduling of computing resources and active maintenance when physical faults occur.

Conventional live migration is implemented in a pre-copy manner. A memory of a virtual machine is copied from a source physical machine to a destination physical machine by iteration while the virtual machine is running on the source physical machine. In this case, because the virtual machine is always in the running state, the memory of the virtual machine needs to be recursively copied to the target-end physical machine through multiple rounds of copy. This operation often takes a long time to perform live migration of the entire virtual machine.

Conventionally, to reduce time required for live migration of a virtual machine, delayed-copy, also known as post-copy, has been provided. When the live virtual machine migration is performed in a delayed-copy manner, a live migration unit in the source physical machine sends context necessary for operation of the virtual machine (briefly referred to as virtual machine CPU context) to a live migration unit in the destination physical machine, and the destination live migration unit triggers the virtual machine to be executed on the destination physical machine. A memory access request (including read and write requests) triggers a page fault if the requested memory page has not been copied to the destination machine. The destination live migration unit copies the corresponding memory page from the source physical machine to the destination virtual machine to read/write the memory page. FIG. 1 is a schematic diagram illustrating the architecture and interaction logic of a virtual machine migration system.

As shown in FIG. 1: 1. A destination virtual machine receives a read request. The read request includes an identifier of a first memory page. 2. A destination virtual machine searches its memory for a memory page corresponding to the identifier of the first memory page. If no memory page corresponding to the identifier of the first memory page is found in the memory of the destination virtual machine, the destination virtual machine sends a read page fault notification to a destination live migration unit The read page fault notification includes the identifier of the first memory page. 3. The destination live migration unit receives the read page fault notification and sends a read copy request to a source live migration unit. The read copy request includes the identifier of the first memory page. 4. The source live migration unit receives the read copy request and searches for and acquires a memory page corresponding to the identifier of the first memory page and an attribute of the memory page in the source virtual machine. 5. The source live migration unit sends the acquired memory page corresponding to the identifier of the first memory page and the acquired attribute of the memory page to the destination live migration unit. 6. The destination live migration unit receives the memory page corresponding to the identifier of the first memory page and the attribute of the memory page and stores them into the memory of the destination virtual machine, such that the destination virtual machine can read the first memory page. 7. The destination virtual machine receives a write request which includes an identifier of a second memory page. 8. The destination virtual machine searches for a memory page corresponding to the identifier of the second memory page. If no memory page corresponding to the identifier of the second memory page is found in the memory, the destination virtual machine sends a write page fault notification to a destination live migration unit. The write page fault notification includes the identifier of the second memory page. 9. The destination live migration unit receives the write page fault notification and sends a write copy request to the source live migration unit The write copy request includes the identifier of the second memory page. 10. The source live migration unit receives the write copy request and searches for and acquires the memory page corresponding to the identifier of the second memory page and an attribute of the memory page in the source virtual machine. 11. The source live migration unit sends the acquired memory page corresponding to the identifier of the second memory page and the acquired attribute of the memory page to the destination live migration unit. 12. The destination live migration unit receives the memory page corresponding to the identifier of the second memory page and the attribute of the memory page and stores them into the memory of the destination virtual machine such that the destination virtual machine can write the second memory page.

However, conventional live migration at least has the following defects: In delayed-copy migration, if the live migration is interrupted due to an exception such as network interruption or failure in creating the virtual machine on the destination physical machine, the virtual machine cannot run independently on the destination physical machine or roll back to the source physical machine. The destination physical machine does not have all memory pages since the live migration is not completed. Therefore, the virtual machine cannot recover from a virtual machine instance and run independently on the destination physical machine. Because the virtual machine has already been run on the destination physical machine, some memory pages on the source physical machine are already expired. The virtual machine cannot recover from a virtual machine instance on the source physical machine. As a result, the virtual machine cannot roll back to and run independently on the source physical machine.

SUMMARY

Embodiments of the present disclosure provide methods and systems for live migration rollback of a live virtual machine. A virtual machine can roll back to and run independently on a source-end physical machine when live migration fails.

The embodiments include a method for performing live migration rollback of a virtual machine. The method includes copying, by a destination physical machine, dirty memory pages corresponding to dirty memory page identifiers in the dirty page record table to a source physical machine for updating and storing the copied dirty memory pages when live migration of a virtual machine fails in a delayed-copy mode.

The embodiments also include a method for performing live migration of a virtual machine. The method includes receiving, by a source physical machine, dirty memory pages corresponding to dirty memory page identifiers in a dirty page table from a destination physical machine upon determination that live migration of a virtual machine fails in a delayed-copy mode and updating and storing, by a source physical machine, copied dirty memory pages.

The embodiments also include a live virtual machine migration processing method. The method include: in a delayed-copy mode, executing, by a destination physical machine for a write request from a source physical machine, a live virtual machine migration procedure corresponding to the write request, and recording, by the destination physical machine in the process of executing the live virtual machine migration procedure corresponding to the write request, an identifier of a memory page corresponding to the write request in a dirty page table upon determination that an attribute of the memory page corresponding to the write request is readable-writable.

The embodiments also include a live virtual machine migration processing system. The system includes a source physical machine and a destination physical machine. The destination physical machine is configured to copy dirty memory pages corresponding to dirty memory page identifiers in the dirty page table to the source physical machine upon determination that live migration of a virtual machine fails in a delayed-copy mode. The source physical machine is configured to update and store the copied dirty memory pages.

The embodiments also include a live virtual machine migration system. The system includes a source physical machine and a destination physical machine. The destination physical machine is configured to: in a delayed-copy mode, execute, for a write request from the source physical machine, a live virtual machine migration procedure corresponding to the write request; and record, in the process of executing the live virtual machine migration procedure corresponding to the write request, an identifier of a memory page corresponding to the write request in a dirty page table upon determination that an attribute of the memory page corresponding to the write request is readable-writable. The source physical machine is configured to send the write request to the destination physical machine.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

In order to facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The embodiments described herein provide technologies for rollback of a virtual machine to a source physical machine upon failure of delayed-copy live migration. The techniques described herein can allow transferring modified memory pages from a destination physical machine to a source physical machine according to an identifier stored in a table indicating modified memory pages for resuming the virtual machine on the source physical machine if a non-network failure causes the live migration failure. The techniques described herein can also use a flag, which indicates live migration failure for the source physical machine to trigger page fault and load memory from external storage for resuming the virtual machine on the source physical machine if a network failure causes the live migration failure.

The live virtual machine migration method and system according to the embodiments of the present disclosure will be described in detail below with reference to the accompanying drawings.

Figure 1:
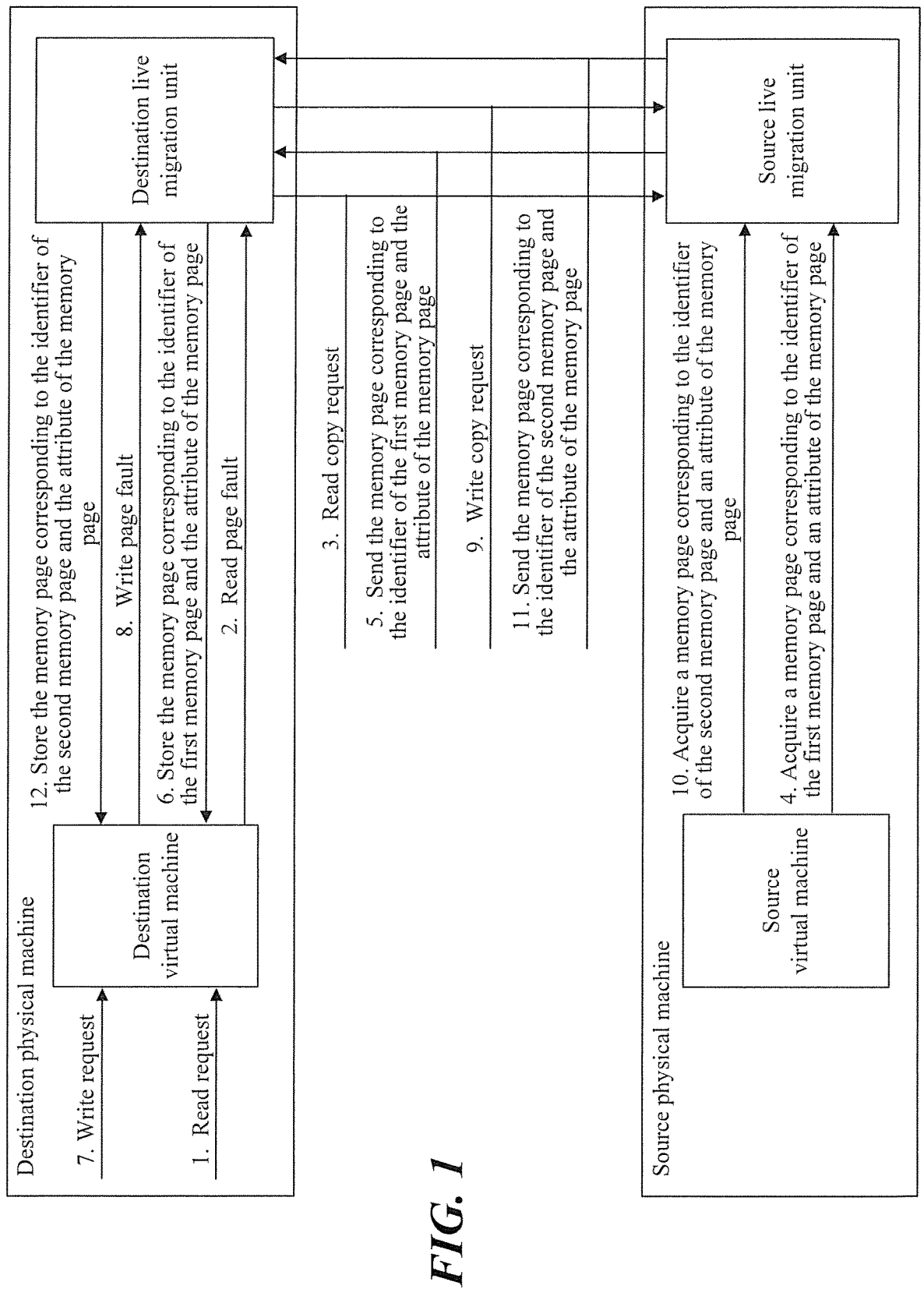
FIG. 1 is a schematic diagram illustrating architecture and interaction logic of a conventional virtual machine migration system.
Figure 2:
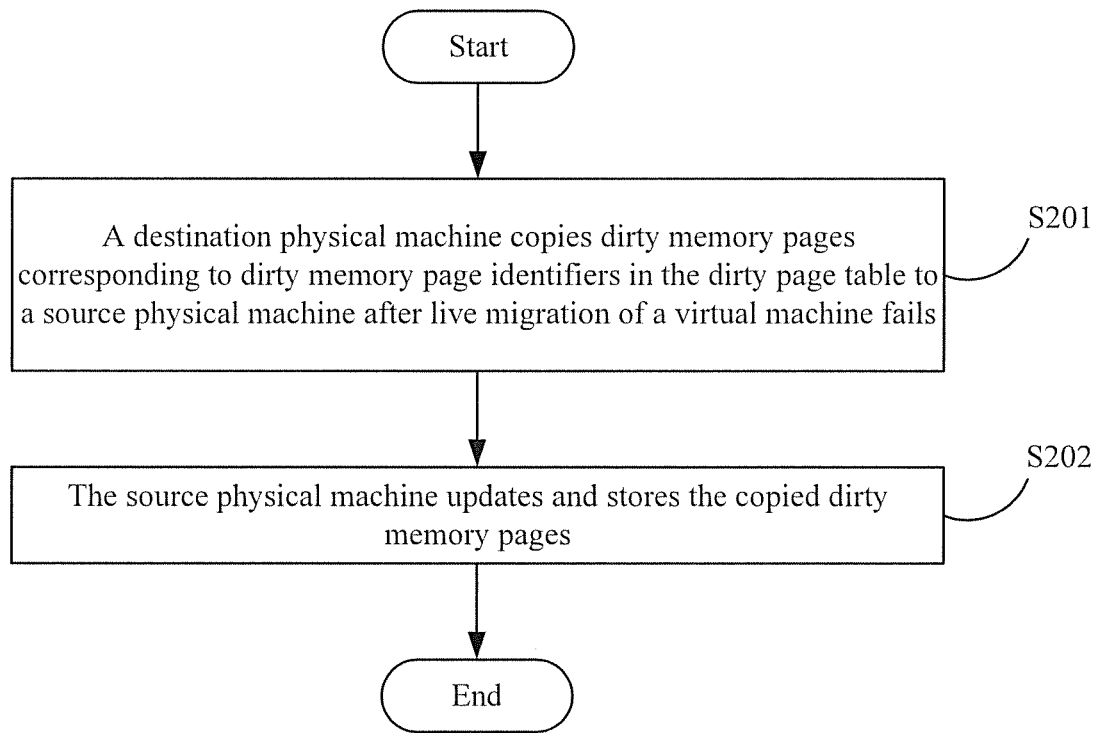
FIG. 2 is a schematic flowchart of an exemplary live virtual machine migration method according to embodiments of the disclosure.

FIG. 2 is a schematic flowchart of an exemplary live virtual machine migration method according to embodiments of the disclosure. The live virtual machine migration method is a migration rollback procedure when live migration fails, and can include the following steps.

In step S201, a destination physical machine copies dirty memory pages corresponding to dirty memory page identifiers in the dirty page table to a preset physical machine when live migration of a virtual machine fails in a delayed-copy mode. A dirty memory page is a memory page on which a write operation has been performed in the destination physical machine during live migration of a virtual machine. In some embodiments, the preset physical machine can be one of a source physical machine, a destination physical machine, or an external memory.

During the live migration of the virtual machine from the source physical machine to the destination physical machine, when the live virtual machine migration fails due to a failure (including a network failure and a non-network failure), the destination physical machine copies dirty memory pages corresponding to a dirty memory page identifiers to the source physical machine. The dirty memory page identifiers are recorded in the dirty page during live migration. The live virtual machine migration failure includes the following failure cases:

1) Network transmission failure between the destination physical machine and the source physical machine, for example, network interruption and low transmission rate or fluctuating transmission rate.

2) No virtual machine instance can be created on the destination physical machine from a migrated virtual machine. Various causes can lead to this, for example, CPU physical characteristics required by the migrated virtual machine cannot be met on the destination physical machine, clock synchronization is abnormal, and the destination physical machine encounters an error.

3) A virtual machine instance encounters operation failure due to, for example, memory copy error during the migration or failure of the destination physical machine.

A monitoring system for managing physical machines can monitor whether one of the above three failure cases occurs. Any of the above cases indicates that the live migration fails The monitoring system can send a notification indicating a live migration failure to the destination physical machine, to trigger step S201 upon detection of one of the above cases. The case 1) is a network failure, and the cases 2) and 3) are non-network failures. Monitoring can be implemented by an operating system built in a physical machine, and once an exception occurs, the destination physical machine executes step S201.

In step S202, the source physical machine updates and stores the copied dirty memory pages.

The source physical machine updates, according to the copied dirty memory pages, locally stored memory pages corresponding to the dirty memory page identifiers in the dirty page table.

When live migration of a virtual machine fails, dirty memory pages corresponding to dirty memory page identifiers in a dirty page table are copied to a source physical machine to be updated and stored, so that the source physical machine has complete and the latest memory pages, and the virtual machine can roll back to and run independently on the source physical machine.

Figure 3:
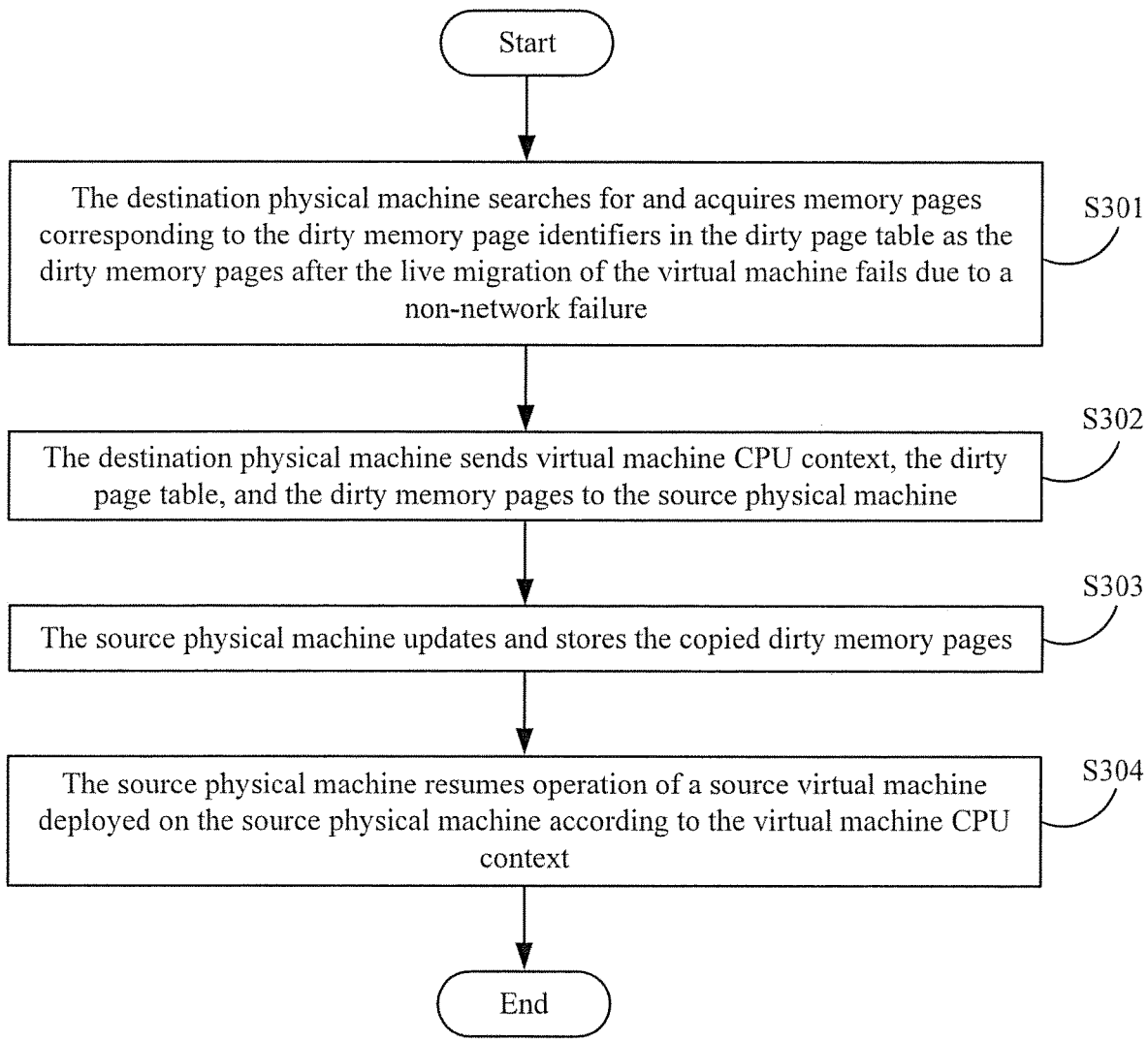
FIG. 3 is a schematic flowchart of an exemplary live virtual machine migration method according to embodiments of the disclosure.

FIG. 3 is a schematic flowchart of an exemplary live virtual machine migration method according to embodiments of the disclosure As shown in FIG. 3, the live virtual machine migration method is another exemplary implementation of the live virtual machine migration processing method shown in FIG. 2 A migration rollback procedure in a pre-copy manner is provided when the live migration fails due to a non-network failure. The method can include the following steps:

step S201 shown in FIG. 2 can correspond to the following steps S301-S302.

In step S301, the destination physical machine searches for and acquires memory pages corresponding to the dirty memory page identifiers in the dirty page table as the dirty memory pages when the live migration of the virtual machine fails due to the non-network failure.

In step S302, the destination physical machine sends virtual machine CPU context of the virtual machine, the dirty page table, and the dirty memory pages to the source physical machine.

When the live migration of the virtual machine fails due to a non-network failure, the destination physical machine and the source physical machine can still be connected through a network. Therefore the destination physical machine can directly send the virtual machine CPU context, the dirty page table, and the dirty memory pages to a rollback physical machine through the network in a pre-copy mode. In some embodiments, the rollback physical machine that performs rollback procedures can be one of a destination physical machine or a source physical machine.

In step S303, the source physical machine updates and stores the received dirty memory pages.

In step S304, the source physical machine resumes operation of the virtual machine on the source physical machine according to the virtual machine CPU context.

Figure 4:
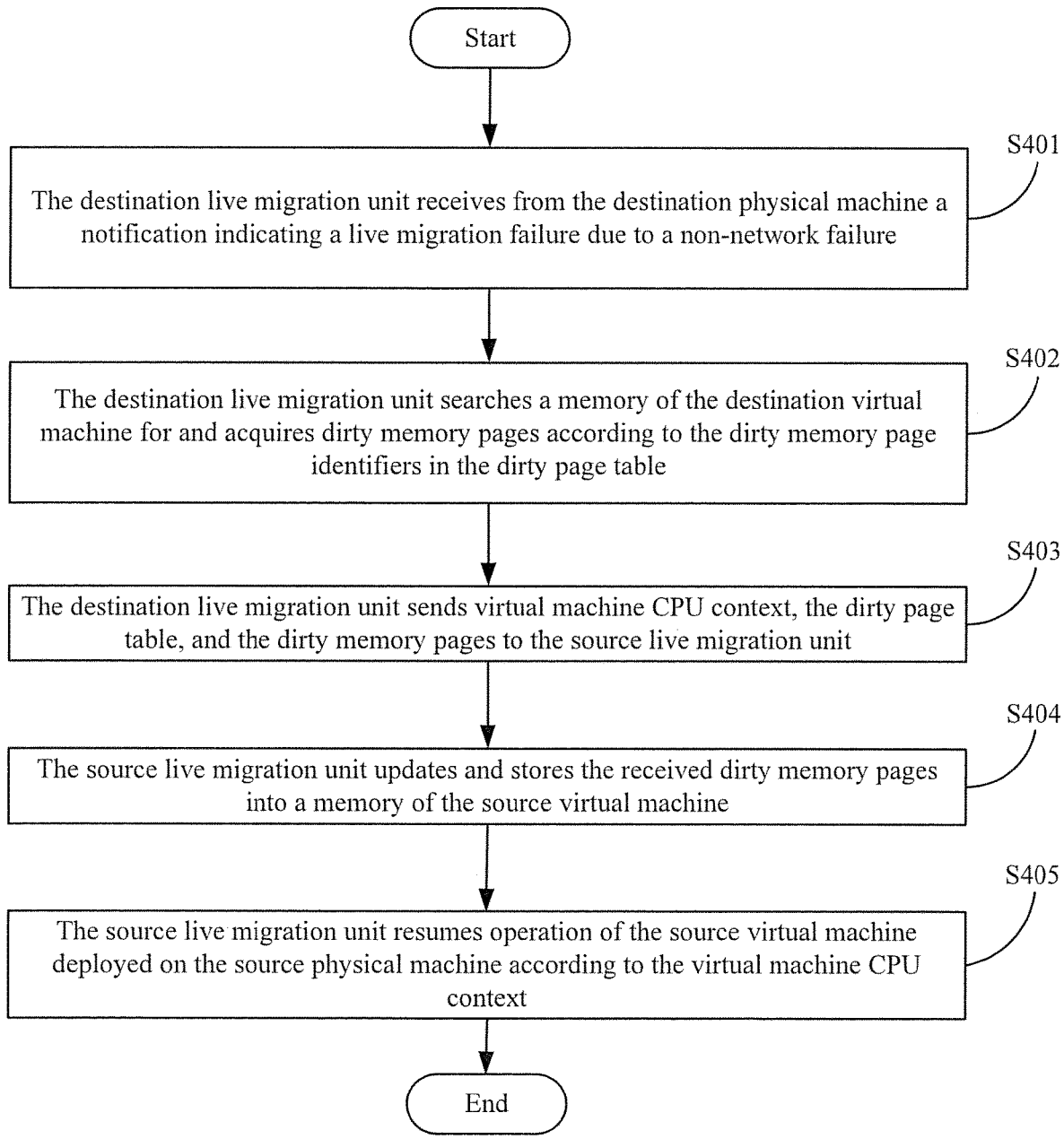
FIG. 4 is a schematic flowchart of another exemplary implementation of the live virtual machine migration method according to the embodiments shown in FIG. 3.

FIG. 4 is a schematic flowchart of another exemplary implementation of the live virtual machine migration method shown in FIG. 3. A source virtual machine and a source live migration unit are deployed on the source physical machine, and a destination virtual machine and a destination live migration unit are deployed on the destination physical machine. As shown in FIG. 4, the method includes the following steps:

In step S401, the destination live migration unit receives from the destination physical machine a notification indicating a live migration failure, where the notification indicating a live migration failure caused by a non-network failure.

In step S402, the destination live migration unit searches for and acquires dirty memory pages corresponding to dirty memory page identifiers in a dirty page table.

In step S403, the destination live migration unit sends virtual machine CPU context, the dirty page table, and the dirty memory pages to the source live migration unit.

In step S404, the source live migration unit updates and stores the received dirty memory pages into a memory of the source virtual machine.

In step S405, the source live migration unit resumes operation of the virtual machine on the source physical machine according to the virtual machine CPU context.

Figure 5:
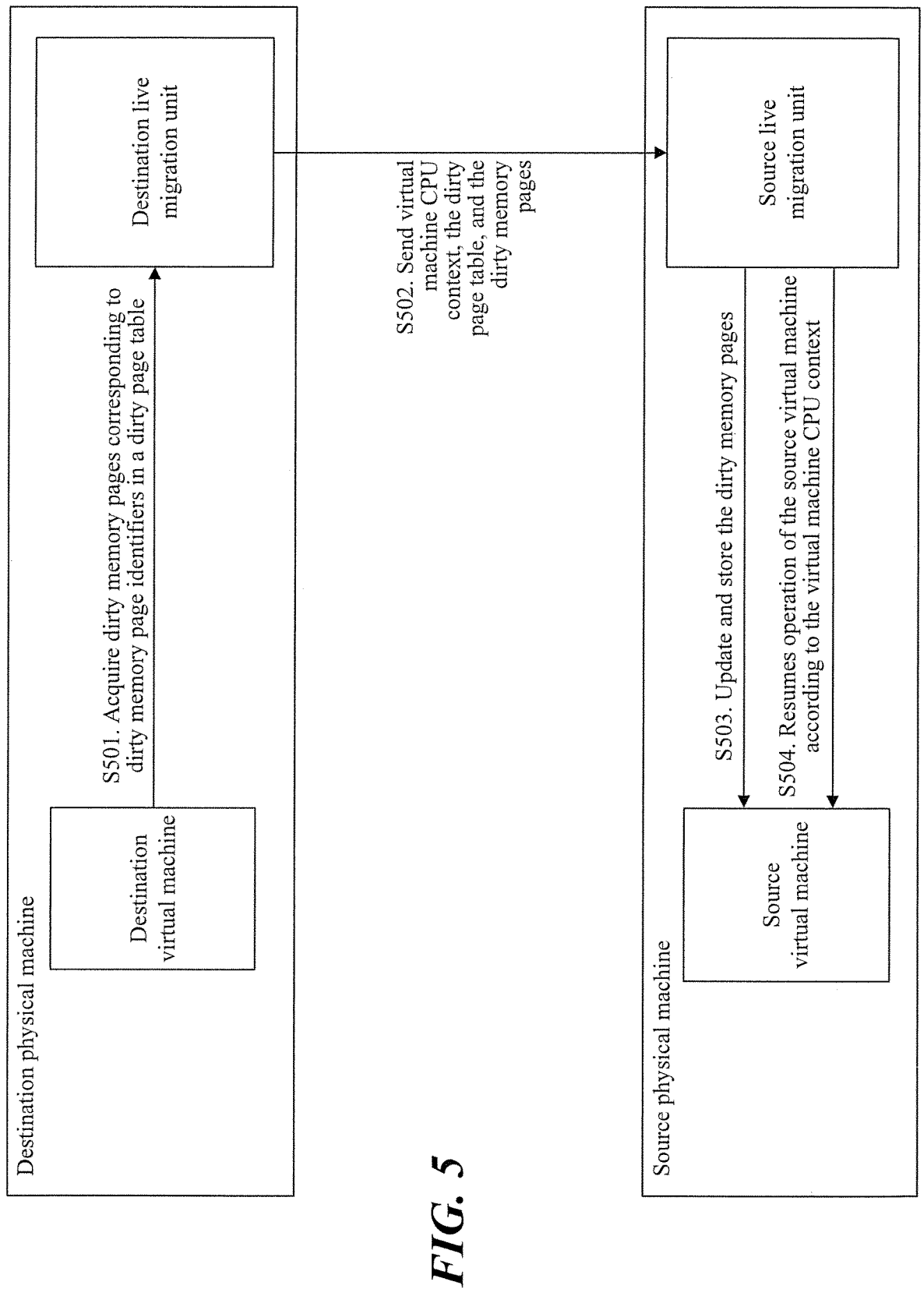
FIG. 5 is a schematic diagram illustrating an exemplary architecture and interaction logic of a virtual machine migration system corresponding to the live virtual machine migration method shown in FIG. 4.

FIG. 5 is a schematic diagram illustrating an exemplary architecture and interaction logic of a virtual machine migration system corresponding to the live virtual machine migration method shown in FIG. 4. A migration rollback procedure in a pre-copy manner is provided when the live migration fails due to a non-network failure. The method includes the following steps:

In step S501, the destination live migration unit searches for and acquires dirty memory pages corresponding to dirty memory page identifiers in a dirty page table.

In step S502, the destination live migration unit sends virtual machine CPU context, the dirty page table, and the dirty memory pages to the source live migration unit.

In step S503, the source live migration unit updates and stores the received dirty memory pages into a memory of the source virtual machine.

In step S504, the source live migration unit resumes operation of the virtual machine on the source physical machine according to the virtual machine CPU context.

When live migration of a virtual machine fails, dirty memory pages corresponding to dirty memory page identifiers in a dirty page table are copied to a source physical machine to be updated and stored, so that the source physical machine has complete and the latest memory pages. The virtual machine can roll back to and run independently on the source physical machine.

Figure 6:
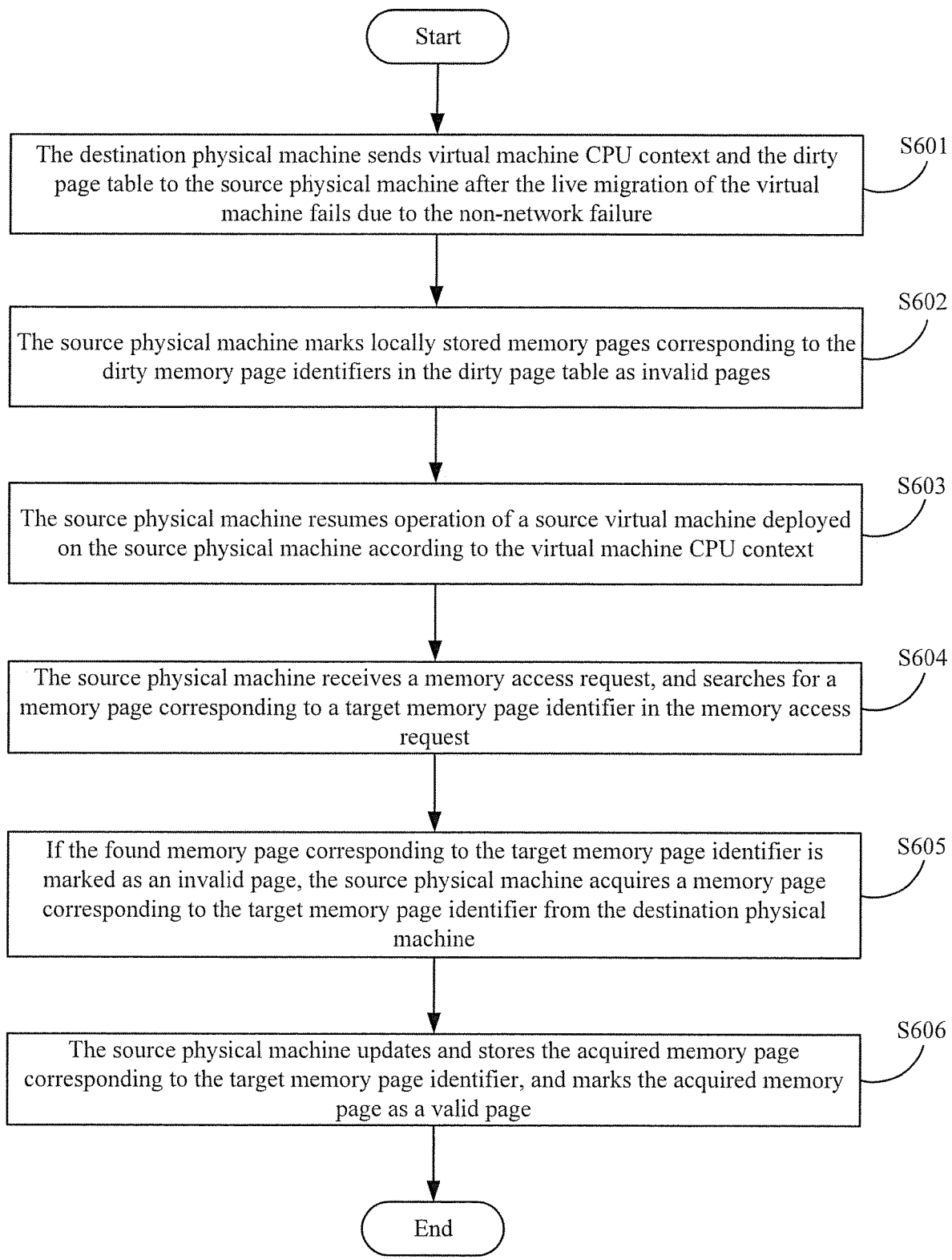
FIG. 6 is a schematic flowchart of an exemplary live virtual machine migration method according to embodiments of the disclosure.

FIG. 6 is a schematic flowchart of an exemplary live virtual machine migration method according to embodiments of the disclosure. As shown in FIG. 6, the exemplary live virtual machine migration method is another implementation of the live virtual machine migration method shown in FIG. 2. A rollback procedure in a delayed-copy manner is provided when the live migration fails due to a non-network failure. The method can include the following steps:

Step S201 shown in FIG. 2 can include the following steps S601-S605.

In step S601, the destination physical machine sends virtual machine CPU context and the dirty page table to the source physical machine when the live migration of the virtual machine fails due to the non-network failure.

In step S602, the source physical machine marks, according to the dirty memory page identifiers in the dirty page table, locally stored memory pages corresponding to the dirty memory page identifiers in the dirty page table as invalid pages.

In step S603, the source physical machine resumes, according to the virtual machine CPU context, operation of a source virtual machine deployed on the source physical machine.

In step S604, the source physical machine receives a memory access request, and searches for a memory page corresponding to a target memory page identifier in the memory access request.

In step S605, if the found memory page corresponding to the target memory page identifier is marked as an invalid page, the source physical machine acquires a memory page corresponding to the target memory page identifier from the destination physical machine.

When the live migration of the virtual machine fails due to a non-network failure, the destination physical machine and the source physical machine can still be connected through a network. Therefore, the destination physical machine can directly send the virtual machine CPU context and the dirty page table to the source physical machine through the network in a delayed-copy (on-demand copying) mode. The source physical machine receives the dirty page table, marks locally stored memory pages corresponding to the dirty memory page identifiers in the dirty page table as invalid pages, and resumes, according to the received virtual machine CPU context, operation of the source virtual machine deployed on the source physical machine. When a memory page marked as an invalid page is accessed in the source physical machine, the source physical machine acquires a corresponding dirty memory page from the destination physical machine. The memory access request can be a read request or a write request.

Step S202 shown in FIG. 2 can correspond to the following step S606.

In step S606, the source physical machine updates and stores the acquired memory page corresponding to the target memory page identifier and marks the acquired memory page as a valid page.

Figure 7:
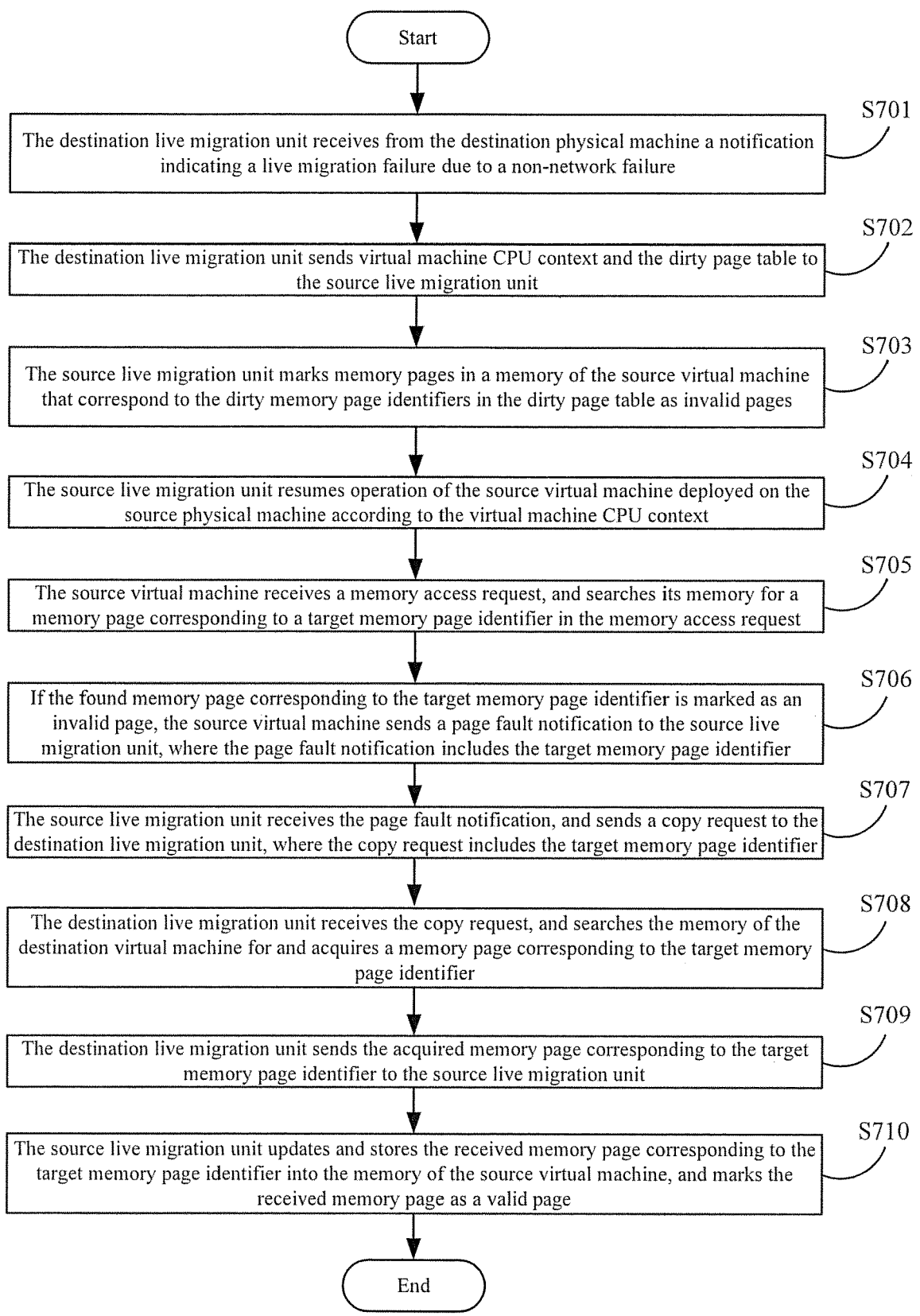
FIG. 7 is a schematic flowchart of another exemplary implementation of the live virtual machine migration method according to the embodiments shown in FIG. 6.

FIG. 7 is a schematic flowchart of another exemplary implementation of the live virtual machine migration method shown in FIG. 6. A source virtual machine and a source live migration unit are deployed on the source physical machine, and a destination virtual machine and a destination live migration unit are deployed on the destination physical machine. As shown in FIG. 7, the method includes the following steps:

In step S701, the destination live migration unit receives from the destination physical machine a notification indicating a live migration failure due to non-network failure.

In step S702, the destination live migration unit sends virtual machine CPU context and the dirty page table to the source live migration unit.

In step S703, the source live migration unit marks memory pages in a memory of the source virtual machine that correspond to the dirty memory page identifiers in the dirty page table as invalid pages.

In step S704, the source live migration unit resumes, according to the virtual machine CPU context, operation of the source virtual machine.

In step S705, the source virtual machine receives a memory access request and searches its memory for a memory page corresponding to a target memory page identifier in the memory access request.

In step S706, if the found memory page corresponding to the target memory page identifier is marked as an invalid page, the source virtual machine sends a page fault notification to the source live migration unit, where the page fault notification includes the target memory page identifier.

In step S707, the source live migration unit receives the page fault notification, and sends a copy request to the destination live migration unit, where the copy request includes the target memory page identifier.

In step S708, the destination live migration unit receives the copy request and searches the memory of the destination virtual machine for and acquires a memory page corresponding to the target memory page identifier.

In step S709, the destination live migration unit sends the acquired memory page corresponding to the target memory page identifier to the source live migration unit.

In step S710, the source live migration unit updates and stores the received memory page corresponding to the target memory page identifier into the memory of the source virtual machine and marks the received memory page as a valid page.

Figure 8:
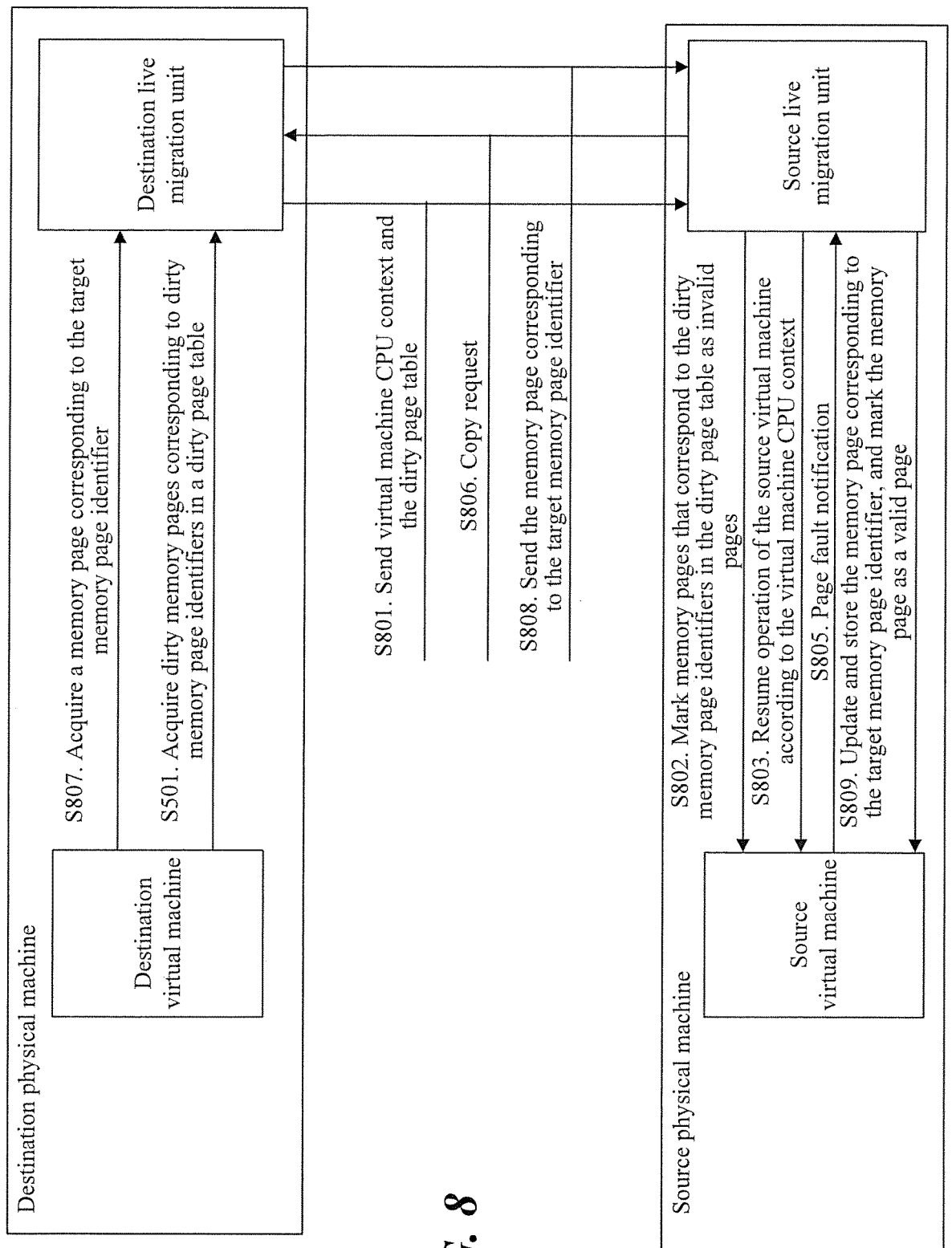
FIG. 8 is a schematic diagram illustrating an exemplary architecture and interaction logic of a virtual machine migration system corresponding to the live virtual machine migration method shown in FIG. 7.

FIG. 8 is a schematic diagram illustrating an exemplary architecture and interaction logic of a virtual machine migration system corresponding to the live virtual machine migration method shown in FIG. 7. A rollback procedure in a delayed-copy manner is provided when the live migration fails due to a non-network failure The method can include the following steps:

When the destination live migration unit receives from the destination physical machine a notification indicating a live migration failure due to a non-network failure:

In step S801, the destination live migration unit sends virtual machine CPU context and the dirty page table to the source live migration unit.

In step S802, the source live migration unit marks memory pages in a memory of the source virtual machine that correspond to the dirty memory page identifiers in the dirty page table as invalid pages.

In step S803, the source live migration unit resumes, according to the virtual machine CPU context, operation of the source virtual machine.

In step S804, the source virtual machine receives a memory access request, where the memory access request includes a target memory page identifier.

In step S805, the source virtual machine searches its memory for a memory page corresponding to the target memory page identifier. If the found memory page corresponding to the target memory page identifier is marked as an invalid page, the source virtual machine sends a page fault notification to the source live migration unit, where the page fault notification includes the target memory page identifier.

In step S806, the source live migration unit receives the page fault notification, and sends a copy request to the destination live migration unit, where the copy request includes the target memory page identifier.

In step S807, the destination live migration unit receives the copy request and searches the memory of the destination virtual machine for and acquires a memory page corresponding to the target memory page identifier.

In step S808, the destination live migration unit sends the acquired memory page corresponding to the target memory page identifier to the source live migration unit.

In step S809, the source live migration unit updates and stores the received memory page corresponding to the target memory page identifier into the memory of the source virtual machine and marks the received memory page as a valid page. When live migration of a virtual machine fails, dirty memory pages corresponding to dirty memory page identifiers in a dirty page table are copied to a source physical machine to be updated and stored, so that the source physical machine has complete and the latest memory pages, and the virtual machine can roll back to and run independently on the source physical machine.

Figure 9:
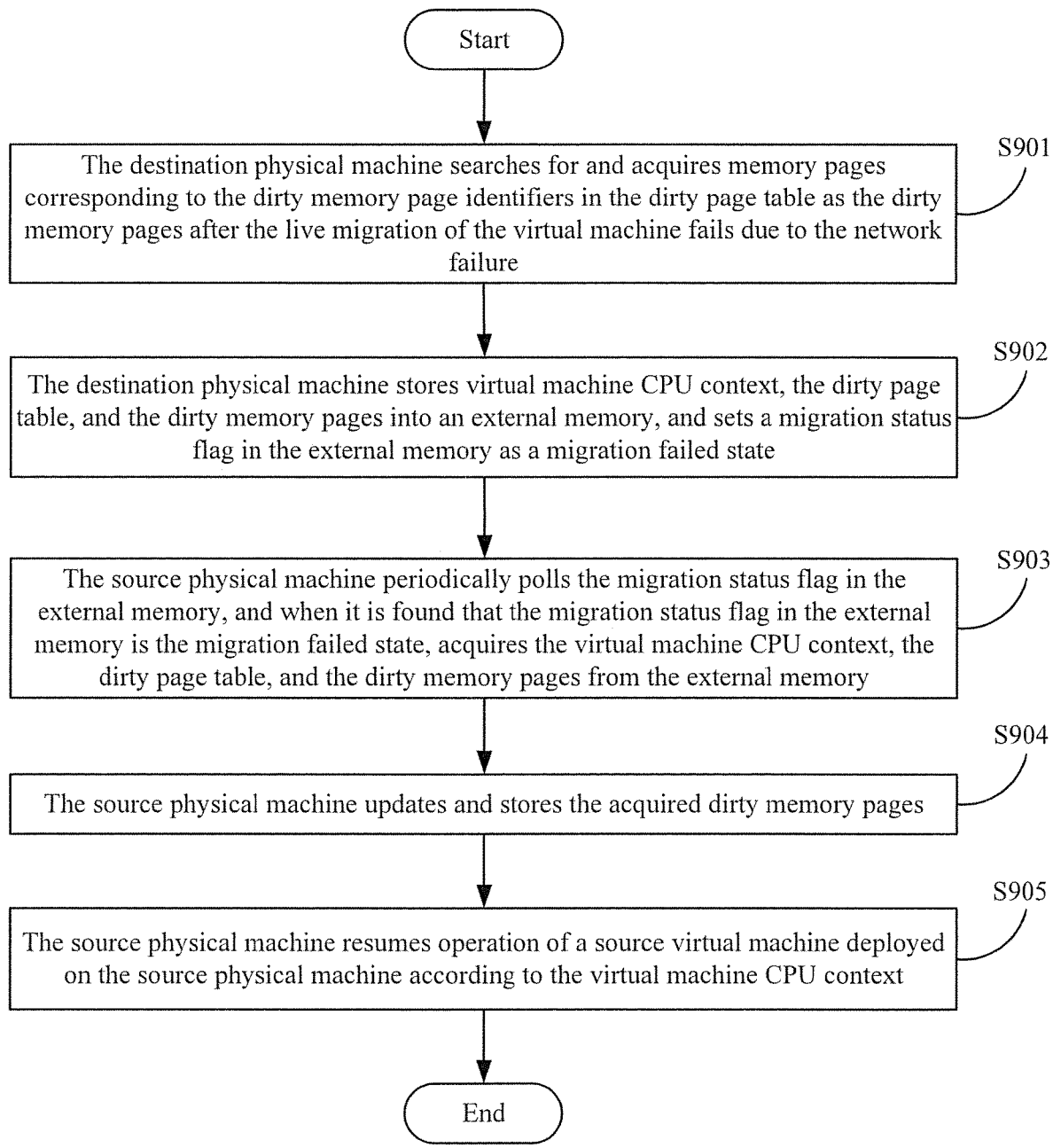
FIG. 9 is a schematic flowchart of an exemplary live virtual machine migration method according to embodiments of the disclosure.

FIG. 9 is a schematic flowchart of an exemplary live virtual machine migration method according to the embodiments of the disclosure. As shown in FIG. 9, the exemplary live virtual machine migration method is another implementation of the live virtual machine migration method shown in FIG. 2. A migration rollback procedure in a pre-copy manner is provided when the live migration fails due to a network failure. The method can include the following steps:

Step S201 shown in FIG. 2 can correspond to the following steps S901-S903.

In step S901, the destination physical machine searches for and acquires memory pages corresponding to the dirty memory page identifiers in the dirty page table as the dirty memory pages when the live migration of the virtual machine fails due to the network failure.

In step S902, the destination physical machine stores virtual machine CPU context, the dirty page table, and the dirty memory pages into an external memory, and sets a migration status flag in the external memory as a migration failed state.

In step S903, the source physical machine periodically polls the migration status flag in the external memory, and when it is found that the migration status flag in the external memory is the migration failed state, acquires the virtual machine CPU context, the dirty page table, and the dirty memory pages from the external memory.

When the live virtual machine migration fails due to a network failure, the destination physical machine and the source physical machine cannot be connected through a network. A network link and a storage link between the destination physical machine and the source physical machine are used separately. Therefore, the destination physical machine can store virtual machine CPU context, the dirty page table, and the dirty memory pages into an external memory in a pre-copy mode. Then the source physical machine acquires the virtual machine CPU context, the dirty page table, and the dirty memory pages from the external memory.

In step S904, the source physical machine updates and stores the acquired dirty memory pages. S Specifically, step S904 can be the same as step S202 shown in FIG. 2.

In step S905, the source physical machine resumes, according to the virtual machine CPU context, operation of a source virtual machine deployed on the source physical machine.

Figure 10:
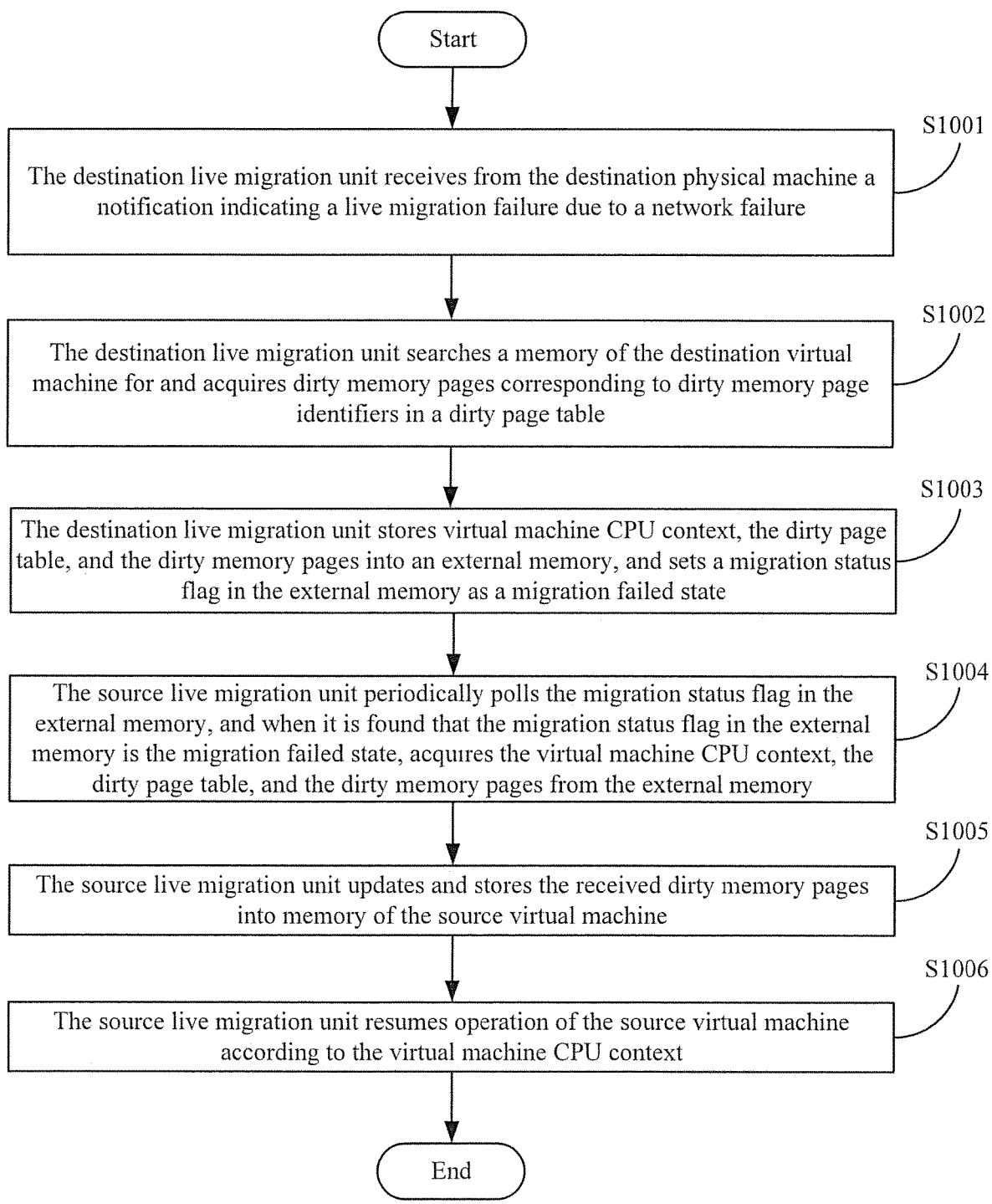
FIG. 10 is a schematic flowchart of another exemplary implementation of the live virtual machine migration method according to the embodiments shown in FIG. 9.

FIG. 10 is a schematic flowchart of another exemplary implementation of the live virtual machine migration method shown in FIG. 9. A source virtual machine and a source live migration unit are deployed on the source physical machine, a destination virtual machine and a destination live migration unit are deployed on the destination physical machine, and a storage link is established between the source physical machine and the destination physical machine through an external memory. As shown in FIG. 10, the method includes the following steps:

In step S1001, the destination live migration unit receives from the destination physical machine a notification indicating a live migration failure due to network failure.

In step S1002, the destination live migration unit searches a memory of the destination virtual machine for and acquires dirty memory pages corresponding to dirty memory page identifiers in a dirty page table.

In step S1003, the destination live migration unit stores virtual machine CPU context, the dirty page table, and the dirty memory pages into an external memory, and sets a migration status flag in the external memory as a migration failed state.

In step S1004, the source live migration unit periodically polls the migration status flag in the external memory, and when it is found that the migration status flag in the external memory is the migration failed state, acquires the virtual machine CPU context, the dirty page table, and the dirty memory pages from the external memory.

In step S1005, the source live migration unit updates and stores the received dirty memory pages into a memory of the source virtual machine.

In step S1006, the source live migration unit resumes operation of the source virtual machine according to the virtual machine CPU context.

Figure 11:
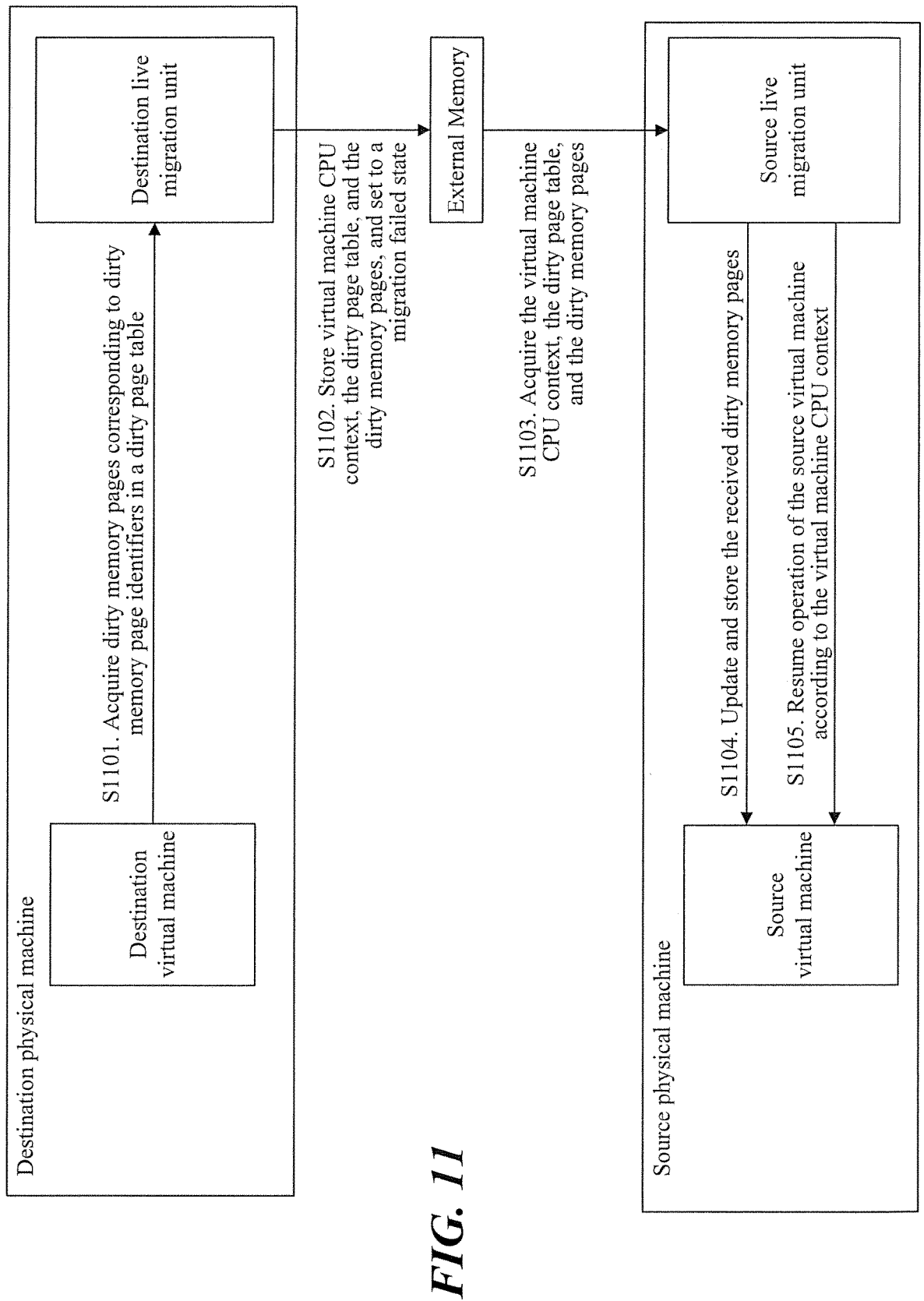
FIG. 11 is a schematic diagram illustrating an exemplary architecture and interaction logic of a virtual machine migration system corresponding to the live virtual machine migration method shown in FIG. 10.

FIG. 11 is a schematic diagram illustrating an exemplary architecture and interaction logic of a virtual machine migration system corresponding to the live virtual machine migration method shown in FIG. 10. A migration rollback procedure in a pre-copy manner is provided when the live migration fails due to a network failure. The method includes the following steps:

When the destination live migration unit receives from the destination physical machine a notification indicating a live migration due to network failure, In step S1101, the destination live migration unit searches a memory of the destination virtual machine for and acquires dirty memory pages corresponding to dirty memory page identifiers in a dirty page table.

In step S1102, the destination live migration unit stores virtual machine CPU context, the dirty page table, and the dirty memory pages into an external memory, and sets a migration status flag in the external memory as a migration failed state.

In step S1103, the source live migration unit periodically polls the migration status flag in the external memory, and when it is found that the migration status flag in the external memory is the migration failed state, acquires the virtual machine CPU context, the dirty page table, and the dirty memory pages from the external memory.

In step S1104, the source live migration unit updates and stores the received dirty memory pages into a memory of the source virtual machine.

In step S1105, the source live migration unit resumes operation of the source virtual machine according to the virtual machine CPU context.

When live migration of a virtual machine fails, dirty memory pages corresponding to dirty memory page identifiers in a dirty page table are copied to a source physical machine to be updated and stored, so that the source physical machine has complete and the latest memory pages, and the virtual machine can roll back to and run independently on the source physical machine.

Figure 12:
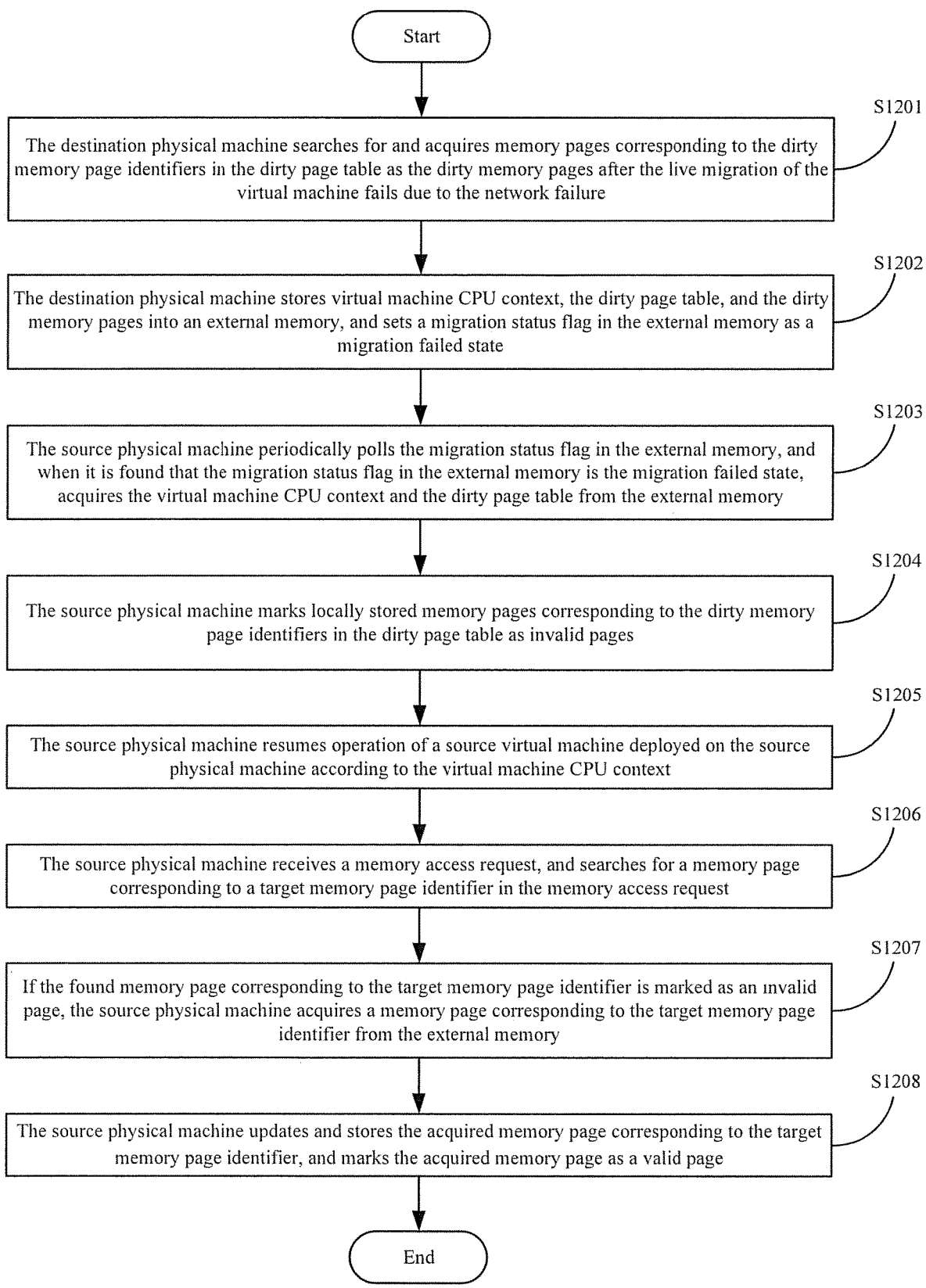
FIG. 12 is a schematic flowchart of an exemplary live virtual machine migration method according to embodiments of the disclosure.

FIG. 12 is a schematic flowchart of an exemplary live virtual machine migration method according to the embodiments of the disclosure. As shown in FIG. 12, the exemplary live virtual machine migration method is another implementation of the live virtual machine migration method shown in FIG. 2. A migration rollback procedure in a delayed-copy manner is provided when the live migration fails due to a network failure. The method can include the following steps:

Step S201 shown in FIG. 2 can include the following steps S1201-S1207.

In step S1201, the destination physical machine searches for and acquires memory pages corresponding to the dirty memory page identifiers in the dirty page table as the dirty memory pages when the live migration of the virtual machine fails due to the network failure.

In step S1202, the destination physical machine stores virtual machine CPU context, the dirty page table, and the dirty memory pages into an external memory, and sets a migration status flag in the external memory as a migration failed state.

In step S1203, the source physical machine periodically polls the migration status flag in the external memory, and when it is found that the migration status flag in the external memory is the migration failed state, acquires the virtual machine CPU context and the dirty page table from the external memory.

In step S1204, the source physical machine marks locally stored memory pages corresponding to the dirty memory page identifiers in the dirty page table as invalid pages.

In step S1205, the source physical machine resume operation of a source virtual machine deployed on the source physical machine according to the virtual machine CPU context.

In step S1206, the source physical machine receives a memory access request, and searches for a memory page corresponding to a target memory page identifier in the memory access request.

In step S1207. If the found memory page corresponding to the target memory page identifier is marked as an invalid page, the source physical machine acquires a memory page corresponding to the target memory page identifier from the external memory.

When the live virtual machine migration fails due to a network failure, the destination physical machine and the source physical machine cannot be connected through a network. A network link and a storage link between the destination physical machine and the source physical machine are used separately. Therefore, the destination physical machine can store virtual machine CPU context, the dirty page table, and the dirty memory pages into an external memory in a delayed-copy (on-demand copying) mode. Then the source physical machine acquires the virtual machine CPU context and the dirty page table from the external memory. The source physical machine marks locally stored memory pages corresponding to the dirty memory page identifiers in the dirty page table as invalid pages, and resumes operation of the source virtual machine deployed on the source physical machine according to the acquired virtual machine CPU context. When a memory page marked as an invalid page is accessed in the source physical machine, the source physical machine acquires a corresponding dirty memory page from the external memory. The memory access request can be a read request or a write request.

Step S202 shown in FIG. 2 can include following step S1208.

In step S1208, the source physical machine updates and stores the acquired memory page corresponding to the target memory page identifier and marks the acquired memory page as a valid page.

Figure 13:
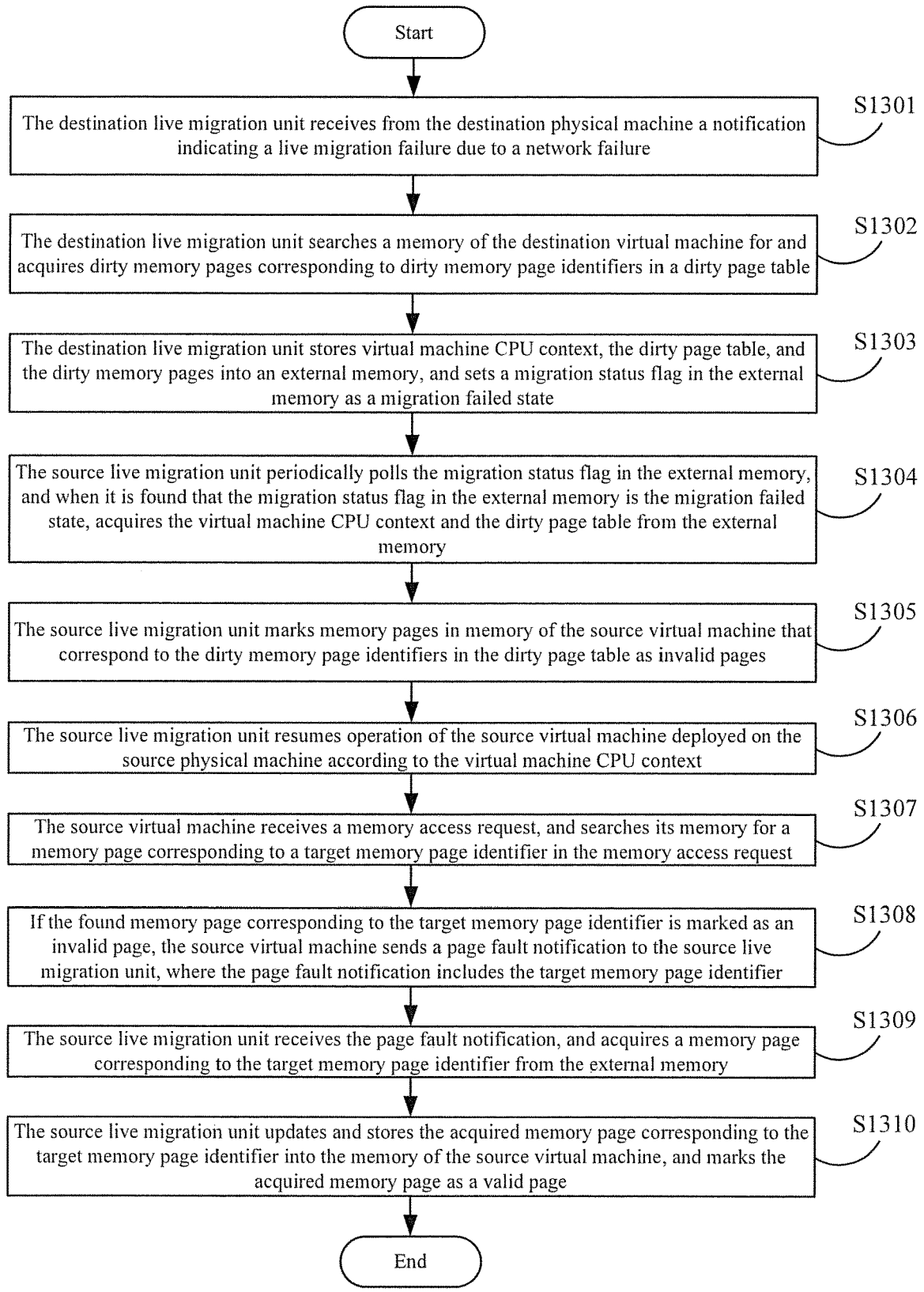
FIG. 13 is a schematic flowchart of another exemplary implementation of the live virtual machine migration method according to the embodiments shown in FIG. 12.

FIG. 13 is a schematic flowchart of another exemplary implementation of the live virtual machine migration method shown in FIG. 12. A source virtual machine and a source live migration unit are deployed on the source physical machine, a destination virtual machine and a destination live migration unit are deployed on the destination physical machine, and a storage link is established between the source physical machine and the destination physical machine through an external memory. As shown in FIG. 13, the method includes the following steps.

In step S1301, the destination live migration unit receives from the destination physical machine a notification indicating a live migration failure due to network failure.

In step S1302, the destination live migration unit searches a memory of the destination virtual machine for and acquires dirty memory pages corresponding to dirty memory page identifiers in a dirty page table.

In step S1303, the destination live migration unit stores virtual machine CPU context, the dirty page table, and the dirty memory pages into an external memory, and sets a migration status flag in the external memory as a migration failed state.

In step S1304, the source live migration unit periodically polls the migration status flag in the external memory, and when it is found that the migration status flag in the external memory is the migration failed state, acquires the virtual machine CPU context and the dirty page table from the external memory.

In step S1305, the source live migration unit marks memory pages in memory of the source virtual machine that correspond to the dirty memory page identifiers in the dirty page table as invalid pages.

In step S1306, the source live migration unit resumes operation of the source virtual machine according to the virtual machine CPU context.

In step S1307, the source virtual machine receives a memory access request and searches its memory for a memory page corresponding to a target memory page identifier in the memory access request.

In step S1308, if the found memory page corresponding to the target memory page identifier is marked as an invalid page, the source virtual machine sends a page fault notification to the source live migration unit, where the page fault notification includes the target memory page identifier.

In step S1309, the source live migration unit receives the page fault notification and acquires a memory page corresponding to the target memory page identifier from the external memory.

In step S1310, the source live migration unit updates and stores the acquired memory page corresponding to the target memory page identifier into the memory of the source virtual machine and marks the acquired memory page as a valid page.

Figure 14:
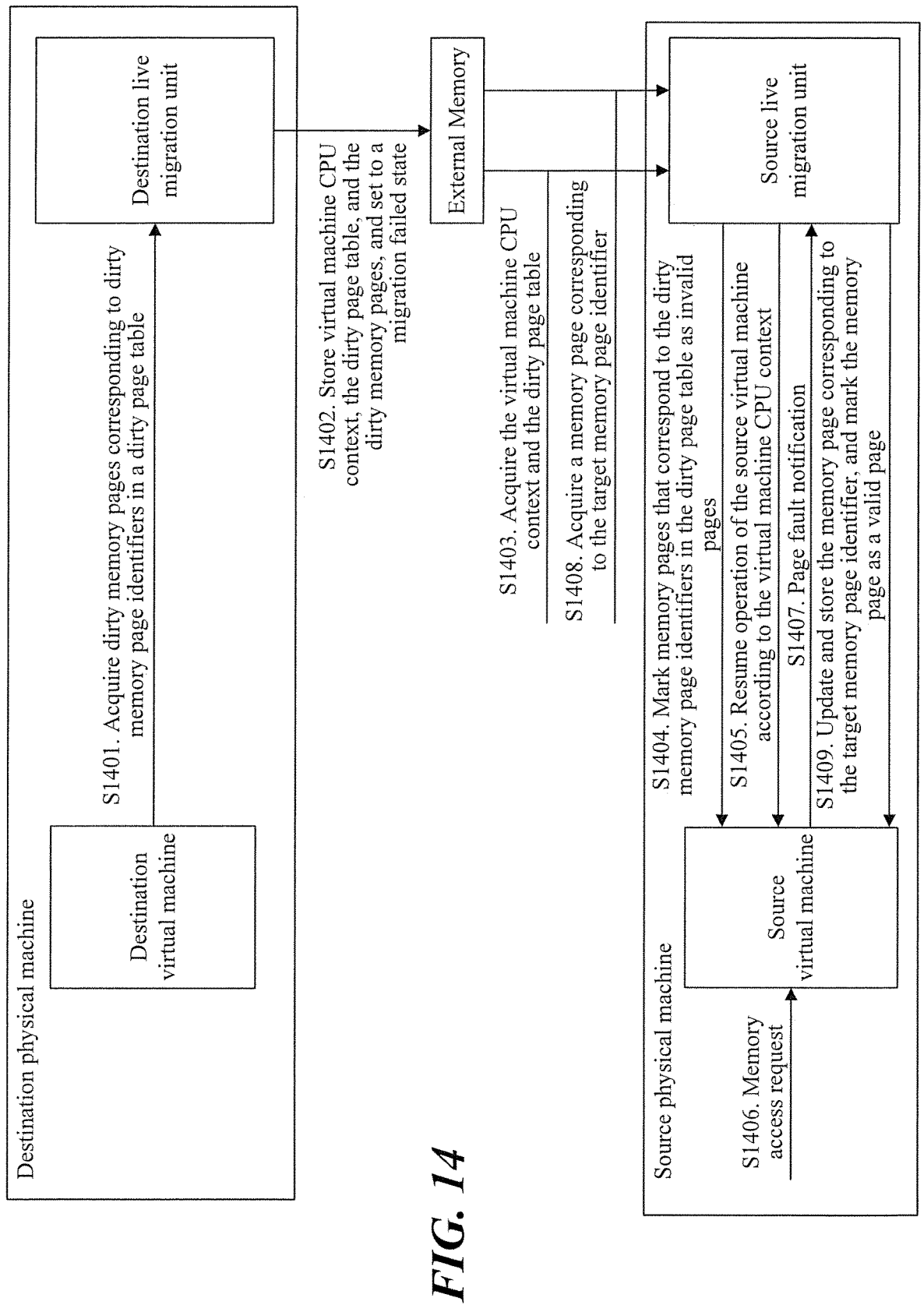
FIG. 14 is a schematic diagram illustrating an exemplary architecture and interaction logic of a virtual machine migration system corresponding to the live virtual machine migration method shown in FIG. 13.

FIG. 14 is a schematic diagram illustrating an exemplary architecture of a virtual machine migration system corresponding to the live virtual machine migration method shown in FIG. 13. A migration rollback procedure in a delayed-copy manner is provided when the live migration fails due to network failure. The method includes the following steps when the destination live migration unit receives from the destination physical machine a notification indicating a live migration failure due to network failure.

In step S1401 the destination live migration unit searches a memory of the destination virtual machine for and acquires dirty memory pages corresponding to dirty memory page identifiers in a dirty page table according to the dirty memory page identifiers in the dirty page table.

In step S1402, the destination live migration unit stores virtual machine CPU context, the dirty page table, and the dirty memory pages into an external memory, and sets a migration status flag in the external memory as a migration failed state.

In step S1403, the source live migration unit periodically polls the migration status flag in the external memory, and when it is found that the migration status flag in the external memory is the migration failed state, acquires the virtual machine CPU context and the dirty page table from the external memory.

In step S1404, the source live migration unit marks memory pages in a memory of the source virtual machine that correspond to the dirty memory page identifiers in the dirty page table as invalid pages.

In step S1405, the source live migration unit resumes operation of the source virtual machine according to the virtual machine CPU context.

In step S1406, the source virtual machine receives a memory access request, where the memory access request includes a target memory page identifier.

In step S1407, the source virtual machine searches its memory for a memory page corresponding to the target memory page identifier. If the found memory page corresponding to the target memory page identifier is marked as an invalid page, the source virtual machine sends a page fault notification to the source live migration unit, where the page fault notification includes the target memory page identifier.

In step S1408, the source live migration unit receives the page fault notification and acquires a memory page corresponding to the target memory page identifier from the external memory.

In step S1409, the source live migration unit updates and stores the acquired memory page corresponding to the target memory page identifier into the memory of the source virtual machine and marks the acquired memory page as a valid page.

When live migration of a virtual machine fails, dirty memory pages corresponding to dirty memory page identifiers in a dirty page table are copied to a source physical machine to be updated and stored, so that the source physical machine has complete and the latest memory pages, and the virtual machine can roll back to and run independently on the source physical machine.

Figure 15:
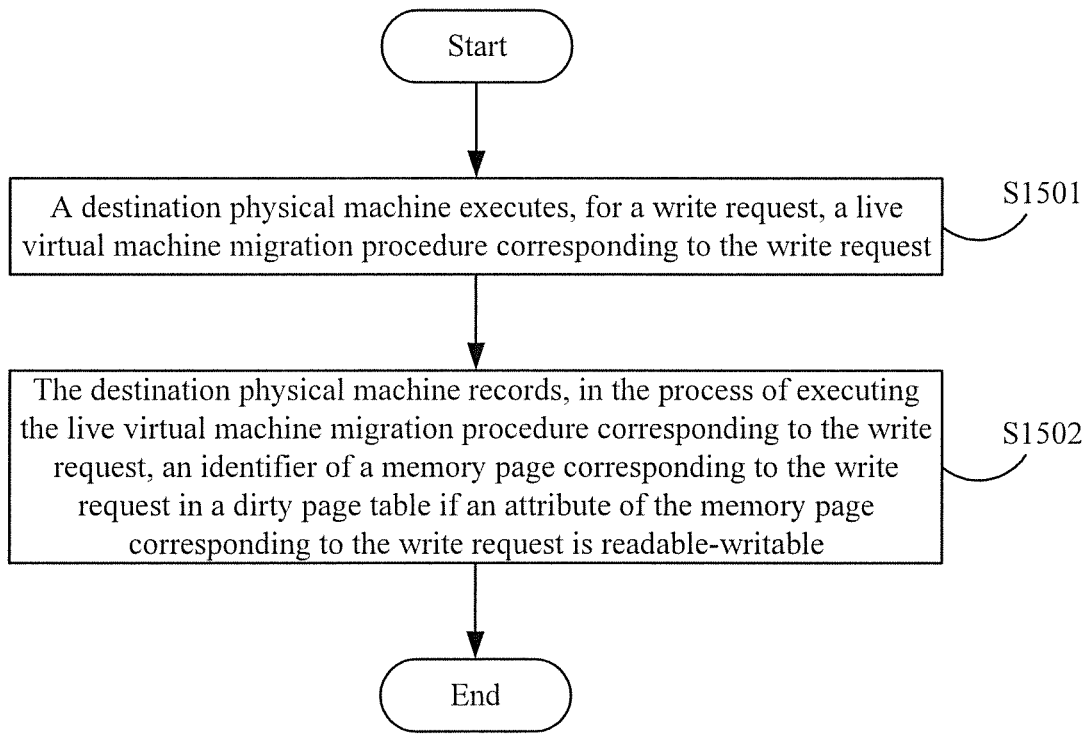
FIG. 15 is a schematic flowchart of an exemplary live virtual machine migration method according to embodiments of the disclosure.

FIG. 15 is a schematic flowchart of an exemplary live virtual machine migration method according to embodiments of the disclosure. As shown in FIG. 15, the exemplary live virtual machine migration method can be implemented independently or in combination with the migration rollback procedure after the virtual machine migration failure shown in FIG. 2 to FIG. 13, and can include the following steps.

In step S1501, in a delayed-copy mode, a destination physical machine executes, for a write request from a source physical machine, a live virtual machine migration procedure corresponding to the write request.

In step S1502, the destination physical machine records, in the process of executing the live virtual machine migration procedure corresponding to the write request, an identifier of a memory page corresponding to the write request in a dirty page table if an attribute of the memory page corresponding to the write request is readable-writable.

The destination physical machine records the identifier of the memory page corresponding to the write request in the dirty page table during live migration if the attribute of the memory page corresponding to the write request is readable-writable. The write operation is performed on the memory page in the destination physical machine. In the migration rollback procedure upon migration failure shown in FIG. 2 to FIG. 13, the dirty memory pages (that is, memory pages on which a write operation has been performed in the destination physical machine) corresponding to dirty memory page identifiers in the dirty page table can be copied to the source physical machine. During the migration of the virtual machine from the source physical machine to the destination physical machine, the attribute of the memory page is copied while the memory page is copied. One memory page should have the same attribute in the source physical machine as in the destination physical machine. When a read-only memory page in the source physical machine is copied to the destination physical machine, the attribute of the memory page is still read-only; when a readable-writable memory page in the source physical machine is copied to the destination physical machine, the attribute of the memory page is still readable-writable. Therefore, if the attribute of the memory page corresponding to the write request is read-only, no write operation can be performed on the memory page, and the identifier of the memory page will not be recorded in the dirty page table.

The destination physical machine records, in a dirty page table in a process of executing a live virtual machine migration procedure corresponding to a write request, an identifier of a memory page that corresponds to the write request and whose attribute is readable-writable. When live migration of a virtual machine fails, dirty memory pages corresponding to dirty memory page identifiers in the dirty page table can be copied to a source physical machine to be updated and stored, so that the source physical machine has complete and the latest memory pages, and the virtual machine can roll back to and run independently on the source physical machine to be independently run.

Figure 16:
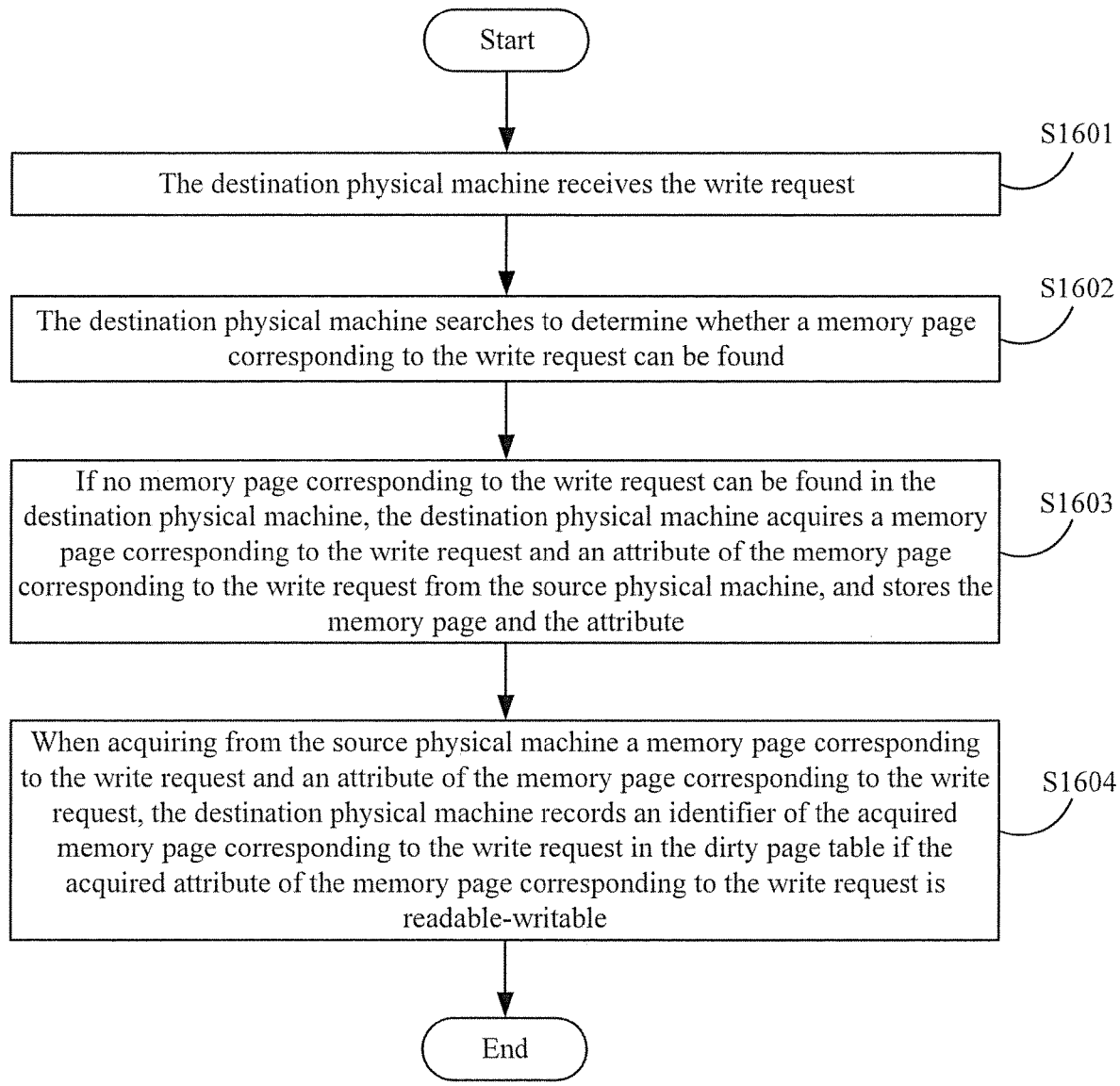
FIG. 16 is a schematic flowchart of an exemplary live virtual machine migration method according to embodiments of the disclosure.

FIG. 16 is a schematic flowchart of an exemplary live virtual machine migration method according to embodiments of the disclosure. As shown in FIG. 16, the live virtual machine migration method of is another implementation of the live virtual machine migration method shown in FIG. 15. A live virtual machine migration method can be implemented independently or in combination with the migration rollback procedure upon the virtual machine migration failure shown in FIG. 2 to FIG. 13, and can include the following steps.

Step S1501 shown in FIG. 15 can include the following steps S1601-S1603.

In step S1601, the destination physical machine receives the write request.

In step S1602, the destination physical machine searches to determine whether a memory page corresponding to the write request can be found.

In step S1603, if no memory page corresponding to the write request can be found in the destination physical machine, the destination physical machine acquires a memory page corresponding to the write request and an attribute of the memory page corresponding to the write request from the source physical machine and stores the memory page and the attribute.

Step S1502 shown in FIG. 15 can correspond to the following step S1604.

In step S1604, when acquiring from the source physical machine a memory page corresponding to the write request and an attribute of the memory page corresponding to the write request, the destination physical machine records an identifier of the acquired memory page corresponding to the write request in the dirty page table if the acquired attribute of the memory page corresponding to the write request is readable-writable.

Figure 17:
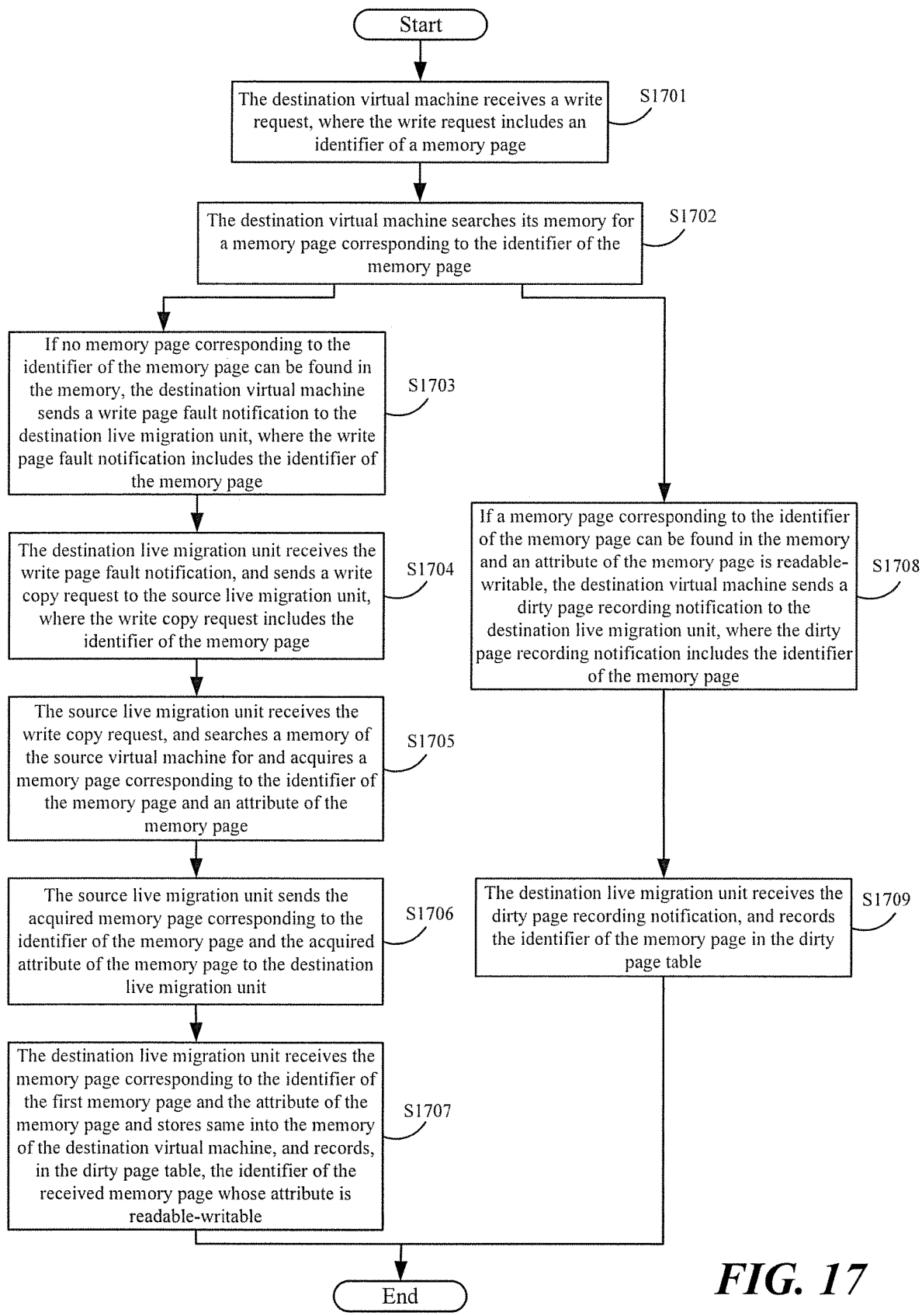
FIG. 17 is a schematic flowchart of another exemplary implementation of the live virtual machine migration method according to the embodiments shown in FIG. 16.

FIG. 17 is a schematic flowchart of another exemplary implementation of the live virtual machine migration method shown in FIG. 16. A source virtual machine and a source live migration unit are deployed on the source physical machine, and a destination virtual machine and a destination live migration unit are deployed on the destination physical machine. As shown in FIG. 17, the method includes the following steps.

In step S1701, the destination virtual machine receives a write request, where the write request includes an identifier of a memory page.

In step S1702, the destination virtual machine searches its memory for a memory page corresponding to the identifier of the memory page.

In step S1703, if no memory page corresponding to the identifier of the memory page can be found in the memory at step S1702, the destination virtual machine sends a write page fault notification to the destination live migration unit, where the write page fault notification includes the identifier of the memory page.

In step S1704, the destination live migration unit receives the write page fault notification, and sends a write copy request to the source live migration unit, where the write copy request includes the identifier of the memory page.

In step S1705, the source live migration unit receives the write copy request and searches a memory of the source virtual machine for and acquires a memory page corresponding to the identifier of the memory page and an attribute of the memory page.

In step S1706, the source live migration unit sends the acquired memory page corresponding to the identifier of the memory page and the acquired attribute of the memory page to the destination live migration unit.

In step S1707, the destination live migration unit receives the memory page corresponding to the identifier of the first memory page and the attribute of the memory page and stores same into the memory of the destination virtual machine, and records, in the dirty page table, the identifier of the received memory page whose attribute is readable-writable. The procedure ends.

On the other hand, at step S1708, if a memory page corresponding to the identifier of the memory page can be found in the memory at step S1702 and an attribute of the memory page is readable-writable, the destination virtual machine sends a dirty page recording notification to the destination live migration unit, where the dirty page recording notification includes the identifier of the memory page.

In step S1709, the destination live migration unit receives the dirty page recording notification and records the identifier of the memory page in the dirty page table. The procedure ends.

Figure 18:
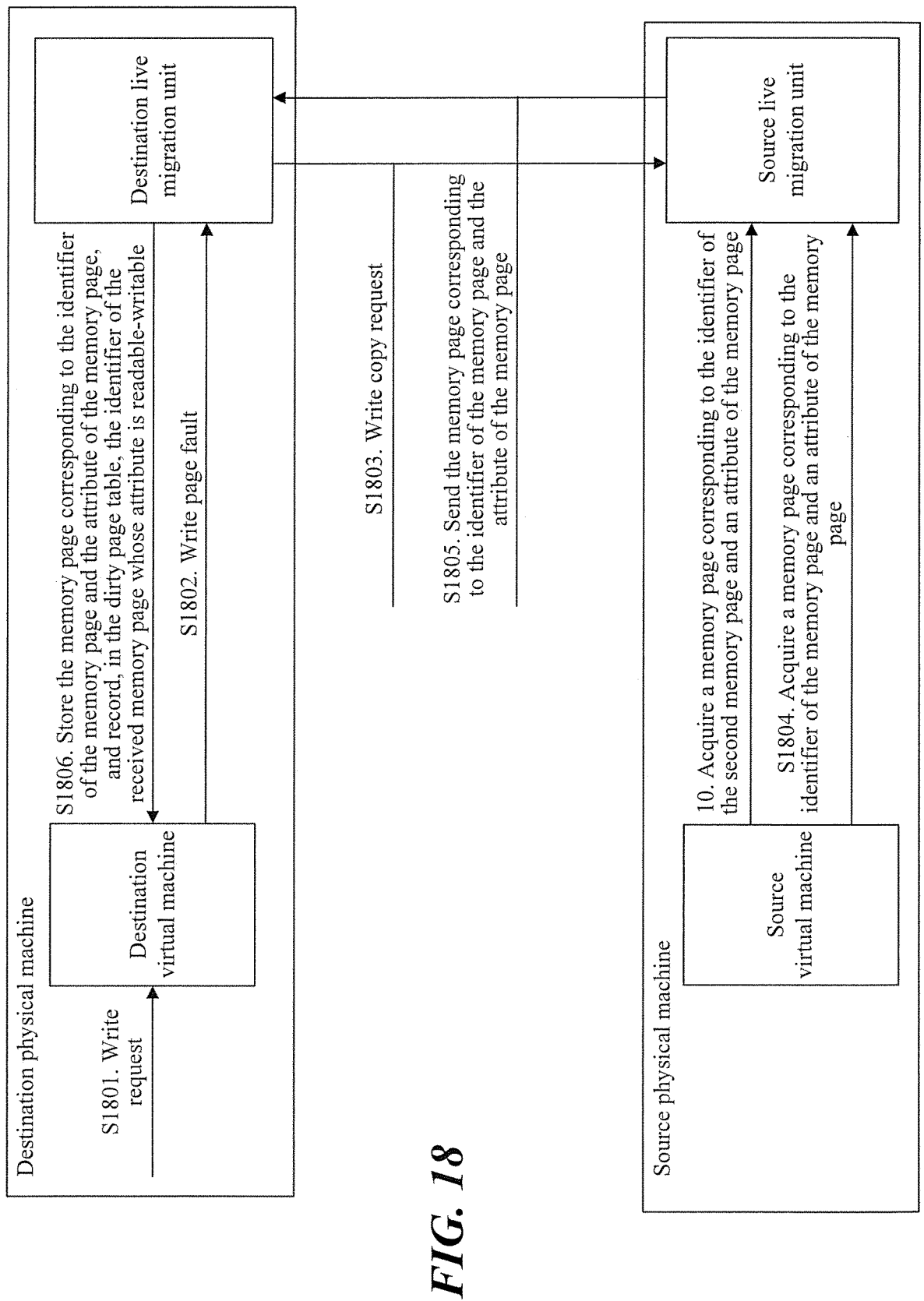
FIG. 18 is a schematic diagram illustrating the architecture and interaction logic of a virtual machine migration system corresponding to the live virtual machine migration method shown in FIG. 17, according to the embodiments of the disclosure.

FIG. 18 is a schematic diagram illustrating an exemplary architecture of a virtual machine migration system corresponding to the live virtual machine migration method shown in FIG. 17. In an example where no memory page corresponding to an identifier of a memory page in a write request can be found in the memory of the destination virtual machine, the method includes the following steps.

In step S1801, the destination virtual machine receives a write request, where the write request includes an identifier of a memory page.

In step S1802, the destination virtual machine searches its memory for a memory page corresponding to the identifier of the memory page. If no memory page corresponding to the identifier of the memory page can be found in the memory, the destination virtual machine sends a write page fault notification to the destination live migration unit, where the write page fault notification includes the identifier of the memory page.

In step S1803, the destination live migration unit receives the write page fault notification, and sends a write copy request to the source live migration unit, where the write copy request includes the identifier of the memory page.

In step S1804, the source live migration unit receives the write copy request and searches a memory of the source virtual machine for and acquires a memory page corresponding to the identifier of the memory page and an attribute of the memory page.

In step S1805, the source live migration unit sends the acquired memory page corresponding to the identifier of the memory page and the acquired attribute of the memory page to the destination live migration unit.

In step S1806, the destination live migration unit receives the memory page corresponding to the identifier of the first memory page and the attribute of the memory page and stores same into the memory of the destination virtual machine, for the destination virtual machine to perform a write operation subsequently on the memory page, and records, in the dirty page table, the identifier of the received memory page whose attribute is readable-writable.

The destination physical machine records, in a dirty page table in a process of executing a live virtual machine migration procedure corresponding to a write request, an identifier of a memory page that corresponds to the write request and whose attribute is readable-writable. When live migration of a virtual machine fails, dirty memory pages corresponding to dirty memory page identifiers in the dirty page table can copied to a source physical machine to be updated and stored, so that the source physical machine has complete and the latest memory pages, and the virtual machine can roll back to and run independently on the source physical machine.

Figure 19:
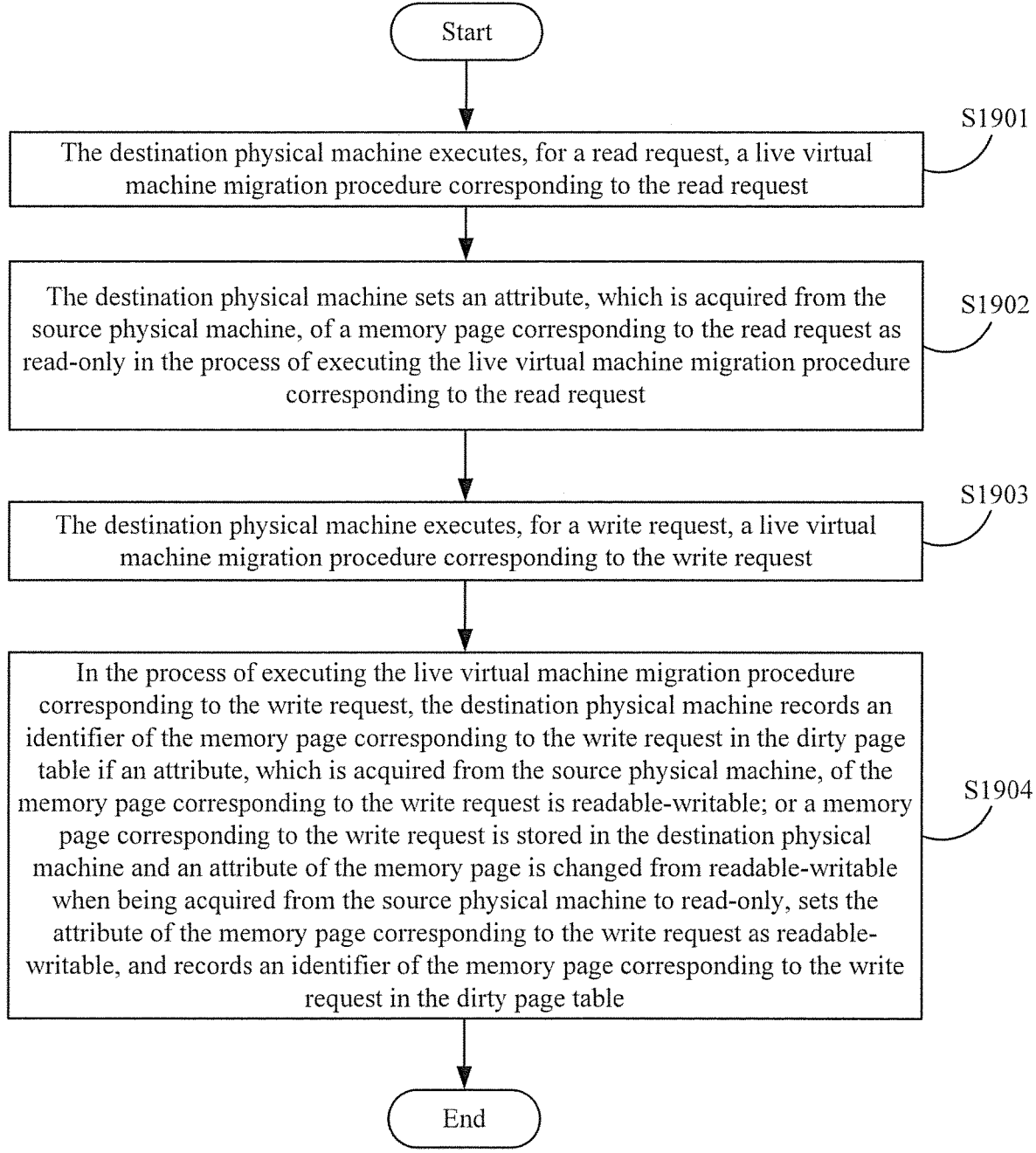
FIG. 19 is a schematic flowchart of an exemplary live virtual machine migration method according to embodiments of the disclosure.

FIG. 19 is a schematic flowchart of an exemplary live virtual machine migration method according to embodiments of the disclosure. As shown in FIG. 19, the exemplary live virtual machine migration method is another implementation of the live virtual machine migration method shown in FIG. 15. The live virtual machine migration method can be implemented independently or in combination with the migration rollback procedure in response to the virtual machine migration failure shown in FIG. 2 to FIG. 14, and can include the following steps In step S1901, the destination physical machine executes, for a read request from the source physical machine, a live virtual machine migration procedure corresponding to the read request.

In step S1902, the destination physical machine sets an attribute, which is acquired from the source physical machine, of a memory page corresponding to the read request as read-only in the process of executing the live virtual machine migration procedure corresponding to the read request.

In step S1903, the destination physical machine executes, for a write request, a live virtual machine migration procedure corresponding to the write request.

Step S1502 shown in FIG. 15 can include the following step S1904.

In step S1904, the destination physical machine records an identifier of the memory page corresponding to the write request in the dirty page table if an attribute, which is acquired from the source physical machine, of the memory page corresponding to the write request is readable-writable. When the attribute of a memory page corresponding to the write request stored in the destination physical machine is changed from readable-writable when being acquired from the source physical machine to read-only, the destination physical machine sets the attribute of the memory page corresponding to the write request as readable-writable and records an identifier of the memory page corresponding to the write request in the dirty page table.

The destination physical machine sets the attribute, which is acquired from the source physical machine, of the memory page corresponding to the read request as read-only in the process of executing the live virtual machine migration procedure corresponding to the read request. In the process of executing the live virtual machine migration procedure corresponding to the write request, the destination physical machine records the identifier of the memory page corresponding to the write request in the dirty page table if the attribute, which is acquired from the source physical machine, of the memory page corresponding to the write request is readable-writable. When the attribute of a memory page corresponding to the write request stored in the destination physical machine is changed from readable-writable when being acquired from the source physical machine to read-only, the destination physical machine sets the attribute of the memory page corresponding to the write request as readable-writable and records an identifier of the memory page corresponding to the write request in the dirty page table. When a write operation is to be performed on a memory page for the first time in the destination physical machine and the original attribute of the memory page is readable-writable, the identifier of the memory page is recorded in the dirty page table. When multiple write operations are to be performed on a memory page and the original attribute of the memory page is readable-writable, the identifier of the memory page is not recorded in the dirty page table to avoid excessive use of resources.

The destination physical machine records, in a dirty page table in a process of executing a live virtual machine migration procedure corresponding to a write request, an identifier of a memory page that corresponds to the write request and whose attribute is readable-writable. When live migration of a virtual machine fails, dirty memory pages corresponding to dirty memory page identifiers in the dirty page table can be copied to a source physical machine to be updated and stored, so that the source physical machine has complete and latest memory pages, and the virtual machine can roll back to and run independently the source physical machine.

Figure 20:
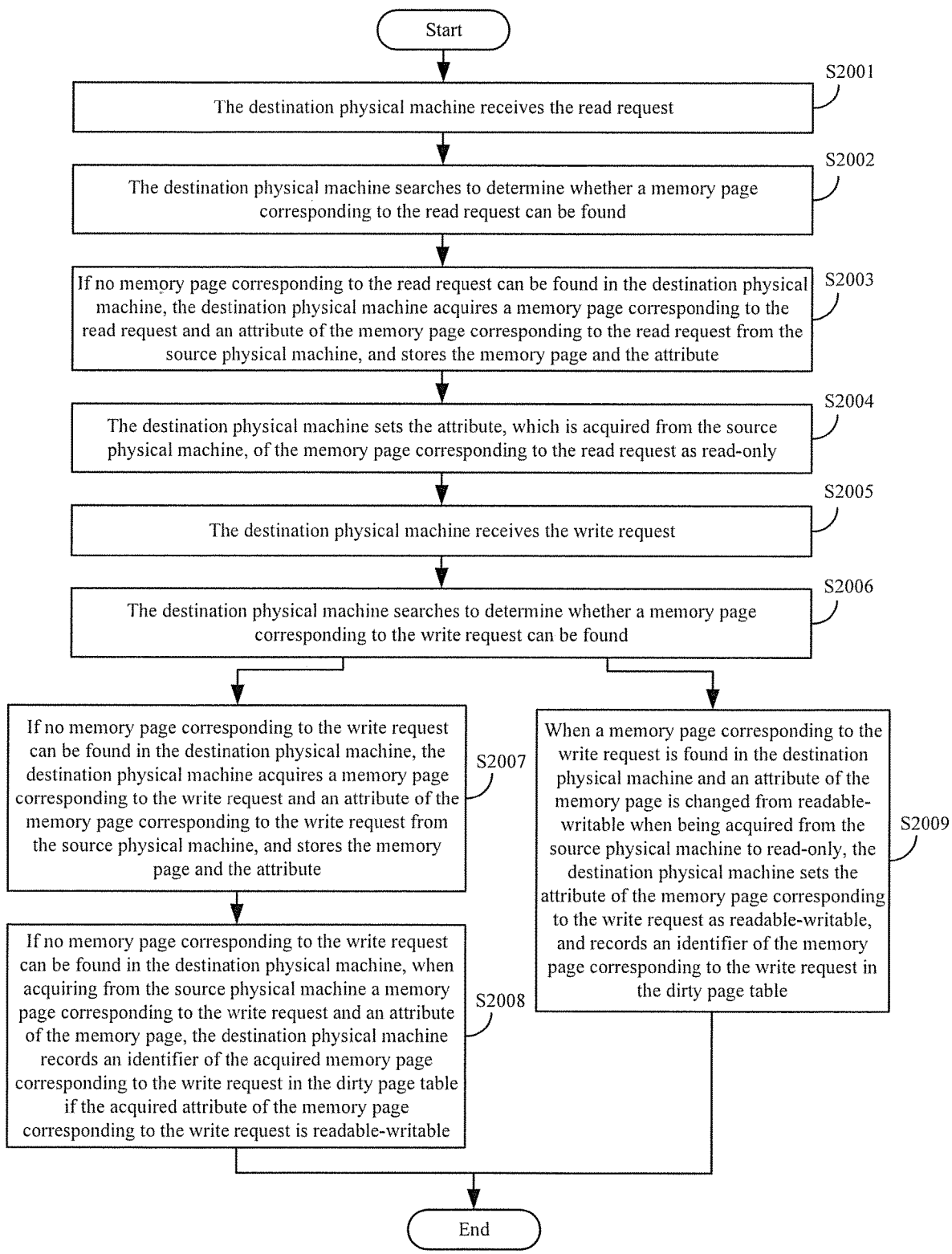
FIG. 20 is a schematic flowchart of an exemplary live virtual machine migration method according to embodiments of the disclosure.

FIG. 20 is a schematic flowchart of an exemplary live virtual machine migration method according to embodiments of the disclosure. As shown in FIG. 20, the exemplary live virtual machine migration method is another implementation of the live virtual machine migration method shown in FIG. 19. The live virtual machine migration method, can be implemented independently or in combination with the migration rollback procedure in response to the virtual machine migration failure shown in FIG. 2 to FIG. 14, and can include the following steps.

Step S1901 shown in FIG. 19 can include the following steps S2001-S2003.

In step S2001, the destination physical machine receives the read request.

In step S2002, the destination physical machine searches to determine whether a memory page corresponding to the read request can be found.

In step S2003, if no memory page corresponding to the read request can be found in the destination physical machine, the destination physical machine acquires a memory page corresponding to the read request and an attribute of the memory page corresponding to the read request from the source physical machine and stores the memory page and the attribute.

Step S1902 shown in FIG. 19 can include the following step S2004.

In step S2004, the destination physical machine sets the attribute, which is acquired from the source physical machine, of the memory page corresponding to the read request as read-only.

Step S1903 shown in FIG. 19 can include the following steps S2005-S2008.

In step S2005, the destination physical machine receives the write request.

In step S2006, the destination physical machine searches to determine whether a memory page corresponding to the write request can be found.

In step S2007, if no memory page corresponding to the write request can be found in the destination physical machine, the destination physical machine acquires a memory page corresponding to the write request and an attribute of the memory page corresponding to the write request from the source physical machine and stores the memory page and the attribute.

Step S1904 shown in FIG. 19 can include the following steps S2008-S2009.

In step S2008, if no memory page corresponding to the write request can be found in the destination physical machine, the destination physical machine acquires from the source physical machine a memory page corresponding to the write request and an attribute of the memory page and records an identifier of the acquired memory page corresponding to the write request in the dirty page table if the acquired attribute of the memory page corresponding to the write request is readable-writable.

In step S2009, when a memory page corresponding to the write request can be found in the destination physical machine at step S2006, an attribute of the memory page is changed from readable-writable when being acquired from the source physical machine to read-only, the destination physical machine sets the attribute of the memory page corresponding to the write request as readable-writable, and records an identifier of the memory page corresponding to the write request in the dirty page table.

Figure 21:
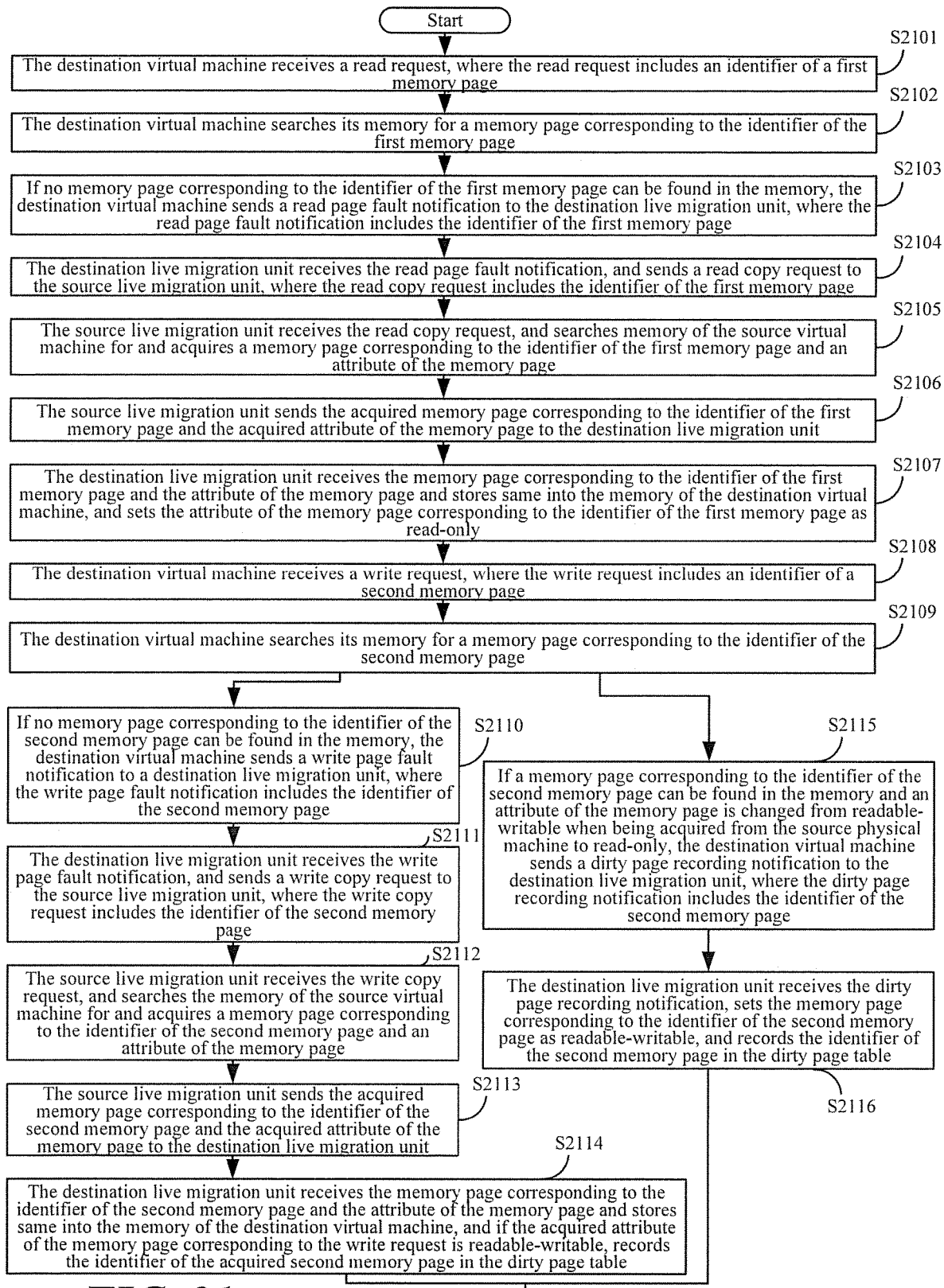
FIG. 21 is a schematic flowchart of another exemplary implementation of the live virtual machine migration method according to the embodiments shown in FIG. 20.

FIG. 21 is a schematic flowchart of another exemplary implementation of the live virtual machine migration method according to the method shown in FIG. 20. A source virtual machine and a source live migration unit are deployed on the source physical machine, and a destination virtual machine and a destination live migration unit are deployed on the destination physical machine. As shown in FIG. 21, the method includes the following steps.

In step S2101, the destination virtual machine receives a read request which includes an identifier of a first memory page.

In step S2102 the destination virtual machine searches its memory for a memory page corresponding to the identifier of the first memory page.

In step S2103, if no memory page corresponding to the identifier of the first memory page is found in the memory, the destination virtual machine sends a read page fault notification to the destination live migration unit, where the read page fault notification includes the identifier of the first memory page.

In step S2104, the destination live migration unit receives the read page fault notification and sends a read copy request to the source live migration unit, where the read copy request includes the identifier of the first memory page.

In step S2105, the source live migration unit receives the read copy request and searches a memory of the source virtual machine for and acquires a memory page corresponding to the identifier of the first memory page and an attribute of the memory page.

In step S2106, the source live migration unit sends the acquired memory page corresponding to the identifier of the first memory page and the acquired attribute of the memory page to the destination live migration unit.

In step S2107, the destination live migration unit receives the memory page corresponding to the identifier of the first memory page and the attribute of the memory page and stores same into the memory of the destination virtual machine and sets the attribute of the memory page corresponding to the identifier of the first memory page as read-only.

In step S2108, the destination virtual machine receives a write request, where the write request includes an identifier of a second memory page.

In step S2109, the destination virtual machine searches its memory for a memory page corresponding to the identifier of the second memory page.

In step S2110, if no memory page corresponding to the identifier of the second memory page is found in the memory at step S2109, the destination virtual machine sends a write page fault notification to a destination live migration unit, where the write page fault notification includes the identifier of the second memory page.

In step S2111, the destination live migration unit receives the write page fault notification, and sends a write copy request to the source live migration unit, where the write copy request includes the identifier of the second memory page.

In step S2112, the source live migration unit receives the write copy request and searches the memory of the source virtual machine for and acquires a memory page corresponding to the identifier of the second memory page and an attribute of the memory page.

In step S2113, the source live migration unit sends the acquired memory page corresponding to the identifier of the second memory page and the acquired attribute of the memory page to the destination live migration unit.

In step S2114, the destination live migration unit receives the memory page corresponding to the identifier of the second memory page and the attribute of the memory page and stores same into the memory of the destination virtual machine, and if the acquired attribute of the memory page corresponding to the write request is readable-writable, records the identifier of the acquired second memory page in the dirty page table. The procedure ends.

In step S2115, when a memory page corresponding to the identifier of the second memory page is found in the memory at step S2109, an attribute of the memory page is changed from readable-writable when being acquired from the source physical machine to read-only, the destination virtual machine sends a dirty page recording notification to the destination live migration unit, where the dirty page recording notification includes the identifier of the second memory page.

In step S2116, the destination live migration unit receives the dirty page recording notification, sets the memory page corresponding to the identifier of the second memory page as readable-writable, and records the identifier of the second memory page in the dirty page table. The procedure ends.

Figure 22:
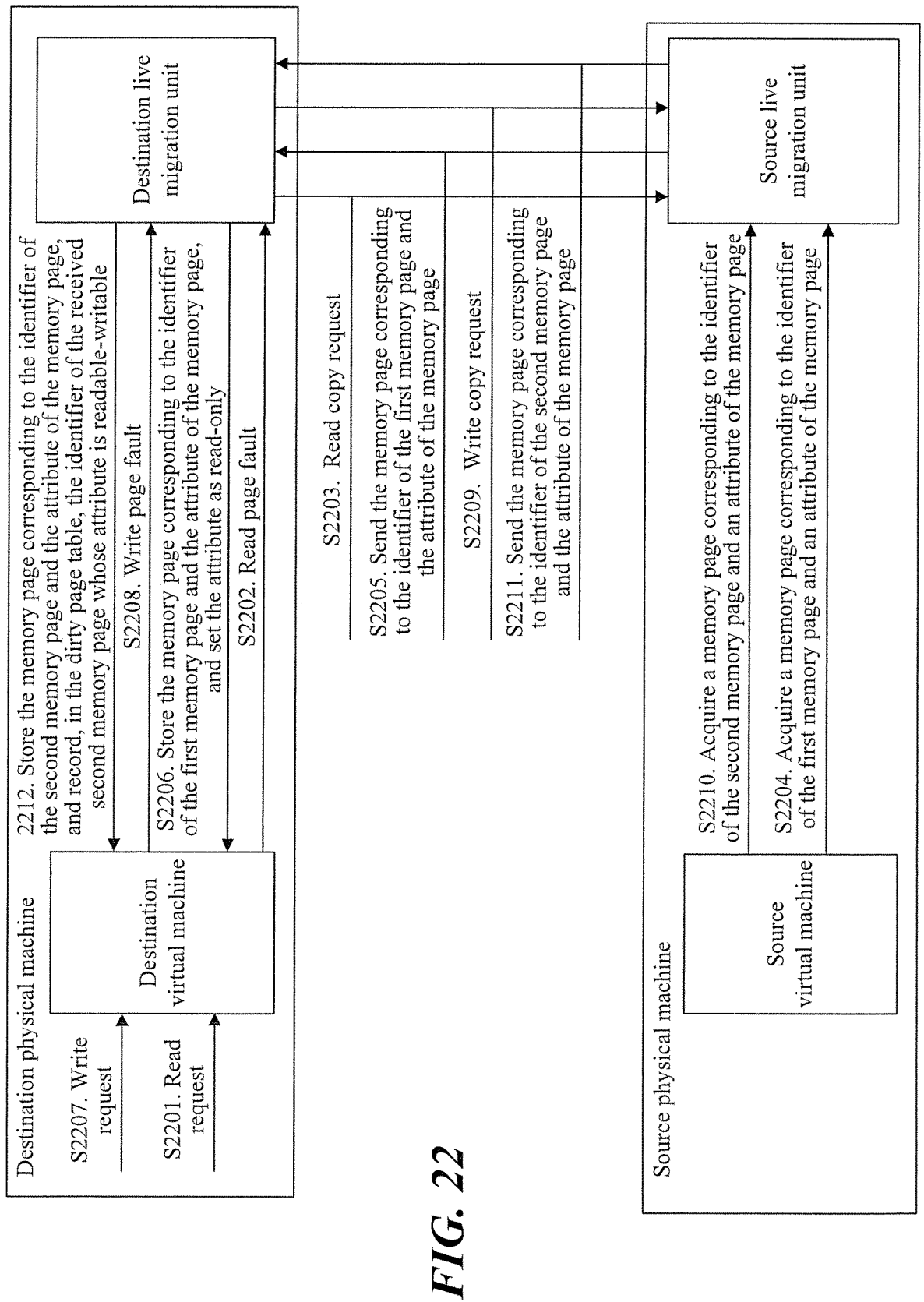
FIG. 22 is a schematic diagram illustrating an exemplary architecture and interaction logic of a virtual machine migration system corresponding to the live virtual machine migration method shown in FIG. 21.

FIG. 22 is a schematic diagram illustrating an exemplary architecture of a virtual machine migration system corresponding to the live virtual machine migration method shown in FIG. 21. In an example where no memory page corresponding to an identifier of a memory page in a read/write request is found in the memory of the destination virtual machine, the method includes the following steps.

In step S2201, the destination virtual machine receives a read request, where the read request includes an identifier of a first memory page.

In step S2202, the destination virtual machine searches its memory for a memory page corresponding to the identifier of the first memory page. If no memory page corresponding to the identifier of the first memory page is found in the memory, the destination virtual machine sends a read page fault notification to the destination live migration unit, where the read page fault notification includes the identifier of the first memory page.

In step S2203, the destination live migration unit receives the read page fault notification and sends a read copy request to the source live migration unit, where the read copy request includes the identifier of the first memory page.

In step S2204, the source live migration unit receives the read copy request and searches a memory of the source virtual machine for and acquires a memory page corresponding to the identifier of the first memory page and an attribute of the memory page.

In step S2205, the source live migration unit sends the acquired memory page corresponding to the identifier of the first memory page and the acquired attribute of the memory page to the destination live migration unit.

In step S2206, the destination live migration unit receives the memory page corresponding to the identifier of the first memory page and the attribute of the memory page and stores same into the memory of the destination virtual machine, for the destination virtual machine to perform a read operation subsequently on the first memory page and sets the attribute of the memory page corresponding to the identifier of the first memory page as read-only.

In step S2207, the destination virtual machine receives a write request, where the write request includes an identifier of a second memory page.

In step S2208, the destination virtual machine searches its memory for a memory page corresponding to the identifier of the second memory page. If no memory page corresponding to the identifier of the second memory page is found in the memory, the destination virtual machine sends a write page fault notification to a destination live migration unit, where the write page fault notification includes the identifier of the second memory page.

In step S2209, the destination live migration unit receives the write page fault notification and sends a write copy request to the source live migration unit, where the write copy request includes the identifier of the second memory page.

In step S2210, the source live migration unit receives the write copy request and searches the memory of the source virtual machine for and acquires a memory page corresponding to the identifier of the second memory page and an attribute of the memory page.

In step S2211, the source live migration unit sends the acquired memory page corresponding to the identifier of the second memory page and the acquired attribute of the memory page to the destination live migration unit.

In step S2212, the destination live migration unit receives the memory page corresponding to the identifier of the second memory page and the attribute of the memory page and stores same into the memory of the destination virtual machine, for the destination virtual machine to perform a write operation subsequently on the memory page, and if the acquired attribute of the memory page corresponding to the write request is readable-writable, records the identifier of the acquired second memory page in the dirty page table.

According to some embodiments of the present disclosure, the destination physical machine records, in a dirty page table in a process of executing a live virtual machine migration procedure corresponding to a write request, an identifier of a memory page that corresponds to the write request and whose attribute is readable-writable. When live migration of a virtual machine fails, dirty memory pages corresponding to dirty memory page identifiers in the dirty page table can be copied to a source physical machine to be updated and stored, so that the source physical machine has complete and latest memory pages, and the virtual machine can roll back to and run independently on the source physical machine.

Figure 23:
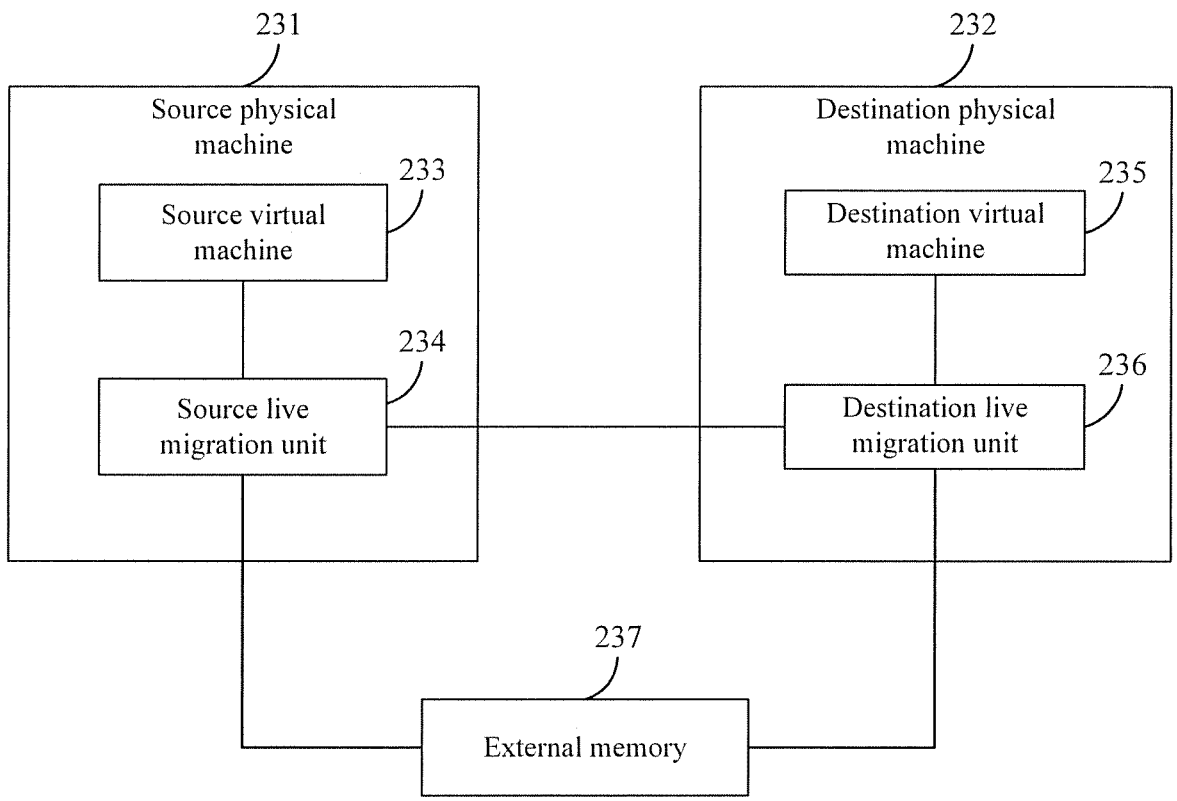
FIG. 23 is a schematic diagram of an exemplary live virtual machine migration system according to embodiments of the disclosure.

FIG. 23 is a schematic diagram of an exemplary live virtual machine migration system according to embodiments of the disclosure. The live virtual machine migration system can execute the live virtual machine migration method shown in FIG. 2 to FIG. 22. As shown in FIG. 23, the live virtual machine migration system can include a source physical machine 231 and a destination physical machine 232, where a source virtual machine 233 and a source live migration unit 234 are deployed on source physical machine 231, and a destination virtual machine 235 and a destination live migration unit 236 are deployed on destination physical machine 232.

In a migration rollback procedure upon live migration failure:

destination physical machine 232 is configured to copy dirty memory pages corresponding to dirty memory page identifiers in the dirty page table to source physical machine 231 when live migration of a virtual machine fails in a delayed-copy mode.

Source physical machine 231 is configured to update and store the copied dirty memory pages.

In some embodiments, when live migration in a pre-copy manner is performed when the live migration fails due to a non-network failure, destination physical machine 232 is configured to: search for and acquire memory pages corresponding to the dirty memory page identifiers in the dirty page table as the dirty memory pages when the live migration of the virtual machine fails due to the non-network failure; and send virtual machine CPU context, the dirty page table, and the dirty memory pages to source physical machine 231.

Further, source physical machine 231 is configured to: after the copied dirty memory pages are updated and stored, resume operation of a source virtual machine 233 deployed on source physical machine 231 according to the virtual machine CPU context.

In some embodiments, rollback in a delayed-copy manner is provided when the live migration fails due to a non-network failure. Destination physical machine 232 is configured to: send virtual machine CPU context and the dirty page table to source physical machine 231 when the live migration of the virtual machine fails due to the non-network failure.

Source physical machine 231 is further configured to: mark, according to the dirty memory page identifiers in the dirty page table, locally stored memory pages corresponding to the dirty memory page identifiers in the dirty page table as invalid pages; resume operation of source virtual machine 233 deployed on source physical machine 231 according to the virtual machine CPU context; receive a memory access request, and search for a memory page corresponding to a target memory page identifier in the memory access request; and if the found memory page corresponding to the target memory page identifier is marked as an invalid page, acquire a memory page corresponding to the target memory page identifier from destination physical machine 232.

Further, source physical machine 231 is configured to: update and store the acquired memory page corresponding to the target memory page identifier and mark the acquired memory page as a valid page.

In some embodiments, rollback in a pre-copy manner is provided when the live migration fails due to a network failure. The system for performing live migration rollback of a virtual machine can further include an external memory 237. Destination physical machine 232 is configured to: search for and acquire memory pages corresponding to the dirty memory page identifiers in the dirty page table as the dirty memory pages when the live migration of the virtual machine fails due to the network failure; and store virtual machine CPU context, the dirty page table, and the dirty memory pages into external memory 237, and set a migration status flag in external memory 237 as a migration failed state.

Source physical machine 231 is further configured to: periodically poll the migration status flag in external memory 237, and when it is found that the migration status flag in external memory 237 is the migration failed state, acquire the virtual machine CPU context, the dirty page table, and the dirty memory pages from external memory 237.

Further, source physical machine 231 is further configured to: resume operation of the source virtual machine 233 deployed on the source physical machine 231 according to the virtual machine CPU context.

In some embodiments, rollback in a delayed-copy manner is provided when the live migration fails due to a network failure. The system for performing live migration rollback of a virtual machine can further include an external memory 237. Destination physical machine 232 is configured to: search for and acquire memory pages corresponding to the dirty memory page identifiers in the dirty page table as the dirty memory pages when the live migration of the virtual machine fails due to the network failure; and store virtual machine CPU context, the dirty page table, and the dirty memory pages into external memory 237, and set a migration status flag in external memory 237 as a migration failed state.

Source physical machine 231 is further configured to: periodically poll the migration status flag in external memory 237, and when it is found that the migration status flag in external memory 237 is the migration failed state, acquire the virtual machine CPU context and the dirty page table from external memory 237; mark locally stored memory pages corresponding to the dirty memory page identifiers in the dirty page table as invalid pages; resume operation of source virtual machine 233 deployed on source physical machine 231 according to the virtual machine CPU context; receive a memory access request, and search for a memory page corresponding to a target memory page identifier in the memory access request; and if the found memory page corresponding to the target memory page identifier is marked as an invalid page, acquire a memory page corresponding to the target memory page identifier from external memory 237.

Further, source physical machine 231 is configured to: update and store the acquired memory page corresponding to the target memory page identifier and mark the acquired memory page as a valid page.

In some embodiments, destination physical machine 232 is configured to: in a delayed-copy mode, execute, for a write request from source physical machine 231, a live virtual machine migration procedure corresponding to the write request; and record, in the process of executing the live virtual machine migration procedure corresponding to the write request, an identifier of a memory page corresponding to the write request in a dirty page table if an attribute of the memory page corresponding to the write request is readable-writable.

Source physical machine 231 is configured to send the write request to destination physical machine 232.

Further, destination physical machine 232 is configured to: receive the write request; search to determine whether a memory page corresponding to the write request can be found; and if no memory page corresponding to the write request can be found in destination physical machine 232, acquire a memory page corresponding to the write request and an attribute of the memory page corresponding to the write request from source physical machine 231, and store the memory page and the attribute.

Further, destination physical machine 232 is configured to: when acquiring from source physical machine 231 a memory page corresponding to the write request and an attribute of the memory page corresponding to the write request, record an identifier of the acquired memory page corresponding to the write request in the dirty page table if the acquired attribute of the memory page corresponding to the write request is readable-writable.

Further, source physical machine 231 is configured to send a read request to destination physical machine 232.

Destination physical machine 232 is further configured to: execute, for the read request from source physical machine 231, a live virtual machine migration procedure corresponding to the read request; and set an attribute, which is acquired from source physical machine 231, of a memory page corresponding to the read request as read-only in the process of executing the live virtual machine migration procedure corresponding to the read request.

Further, destination physical machine 232 is configured to: receive the read request; search to determine whether a memory page corresponding to the read request can be found; and if no memory page corresponding to the read request is found in destination physical machine 232, acquire a memory page corresponding to the read request and an attribute of the memory page corresponding to the read request from source physical machine 231, and store the memory page and the attribute.

Further, destination physical machine 232 is configured to: when acquiring from source physical machine 231 a memory page corresponding to the write request, record an identifier of the memory page corresponding to the write request in the dirty page table if an attribute of the acquired memory page corresponding to the write request is readable-writable.

Further, destination physical machine 232 is further configured to: when a memory page corresponding to the write request is found in destination physical machine 232, an attribute of the memory page is changed from readable-writable when being acquired from source physical machine 232 to read-only, set the attribute of the memory page corresponding to the write request as readable-writable, and record an identifier of the memory page corresponding to the write request in the dirty page table.

In some embodiments, when live migration of a virtual machine fails, dirty memory pages corresponding to dirty memory page identifiers in a dirty page table are copied to a source physical machine to be updated and stored, so that the source physical machine has complete and the latest memory pages, and the virtual machine can roll back to and run independently on the source physical machine.

It is appreciated that all or some of the procedures in the methods of the foregoing embodiments can be implemented by a program instructing relevant hardware components of a terminal device (for example, a destination physical machine and a source physical machine). The program can be stored in a computer readable storage medium. The storage medium includes a flash memory, a Read-Only Memory (ROM), a Random Access Memory (RAM), a magnetic disk, or an optical disc.

Based on the several embodiments provided in the present disclosure, it should be appreciated that the disclosed technical contents may be implemented in another manner. The described apparatus, system, and method embodiments are only exemplary. For example, division of units is merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above descriptions are only exemplary embodiments provided in the present disclosure. Consistent with the present disclosure, those of ordinary skill in the art can incorporate variations and modifications in actual implementation without departing from the principles of the present disclosure. Such variations and modifications shall all fall within the protection scope of the present disclosure.

What is claimed is:

1. A method for performing live migration of a virtual machine by a destination physical machine, comprising:
copying dirty memory pages corresponding to dirty memory page identifiers in a dirty page table to a preset physical machine for updating and storing the copied dirty memory pages in response to a determination that live migration of a virtual machine has failed in a delayed-copy mode.

2. The method according to claim 1, wherein copying dirty memory pages comprises:
acquiring memory pages corresponding to the dirty memory page identifiers in the dirty page table as the dirty memory pages in response to a determination that the live migration of the virtual machine has failed.

3. The method according to claim 1, wherein copying dirty memory pages comprises:
in response to a determination that the live migration of the virtual machine has failed, sending CPU context of the virtual machine, the dirty page table, and the dirty memory pages to a rollback physical machine for updating and storing the copied dirty memory pages.

4. The method according to claim 1, wherein copying dirty memory pages comprises:
in response to a determination that the live migration of the virtual machine has failed, setting a migration status flag in the preset physical machine as a migration failed state.

5. The method according to claim 1, further comprising:
recording, prior to copying dirty memory pages, during a live virtual machine migration procedure for a write request, an identifier of each memory page corresponding to the write request in the dirty page table in response to a determination that an attribute of the memory page corresponding to the write request is readable-writable.

6. The method according to claim 5, wherein recording the identifier of each memory page comprises:
acquiring from a source physical machine a memory page associated with the write request and an attribute of the memory page associated with the write request, and
recording an identifier of the acquired memory page corresponding to the write request in the dirty page table in response to the determination that the attribute of the memory page corresponding to the write request is readable-writable.

7. The method according to claim 5, wherein recording the identifier of each memory page comprises:
setting, during a live virtual machine migration processing procedure corresponding to a read request, an attribute of a memory page corresponding to the read request as read-only, wherein the attribute is acquired from a source physical machine; and
copying the dirty memory pages corresponding to the dirty memory page identifiers in the dirty page table to the preset physical machine in response to the determination that live migration of the virtual machine has failed.

8. The method according to claim 7, further comprising:
acquiring from the source physical machine a memory page corresponding to the write request, and
recording an identifier of the memory page corresponding to the write request in the dirty page table in response to the determination the attribute of the acquired memory page corresponding to the write request is readable-writable.

9. The method according to claim 8, wherein recording the identifier of each memory page comprises:
in response to a determination that a memory page corresponding to the write request in the destination physical machine is found and an attribute of the memory page is changed from readable-writable when being acquired from the source physical machine to read-only:
  setting the attribute of the memory page in the destination physical machine corresponding to the write request as readable-writable, and
  recording an identifier of the memory page corresponding to the write request in the dirty page table.

10. The method according to claim 1, further comprising:
monitoring, during the live migration of the virtual machine, whether a failure case occurs, the failure case being one of network transmission failure between the destination physical machine and the source physical machine, failure to create a virtual machine instance, or an operation failure of a created virtual machine instance; and
sending a notification indicating a live virtual machine migration failure to the destination physical machine in response to a determination that a failure case has occurred.

11. A destination physical machine for performing live migration of a virtual machine, the destination physical machine comprising:
a memory storing a set of instructions; and
one or more processors configured to execute the set of instructions to cause the destination physical machine to perform:
  copying dirty memory pages corresponding to dirty memory page identifiers in a dirty page table to a preset physical machine for updating and storing the copied dirty memory pages in response to a determination that live migration of a virtual machine has failed in a delayed-copy mode.

12. The destination physical machine according to claim 11, wherein copying dirty memory pages comprises:
acquiring memory pages corresponding to the dirty memory page identifiers in the dirty page table as the dirty memory pages in response to a determination that the live migration of the virtual machine has failed.

13. The destination physical machine according to claim 11, wherein copying dirty memory pages comprises:
in response to a determination that the live migration of the virtual machine has failed, sending CPU context of the virtual machine, the dirty page table and the dirty memory pages to a rollback physical machine for updating and storing the copied dirty memory pages.

14. The destination physical machine according to claim 11, wherein copying dirty memory pages comprises:
in response to a determination that the live migration of the virtual machine has failed, setting a migration status flag in the preset physical machine as a migration failed state.

15. The destination physical machine according to claim 11, wherein the one or more processors are configured to execute the set of instructions to cause the destination physical machine to further perform:
recording, prior to copying dirty memory pages, during a live virtual machine migration procedure for a write request, an identifier of each memory page corresponding to the write request in the dirty page table in response to a determination that an attribute of the memory page corresponding to the write request is readable-writable.

16. The destination physical machine according to claim 15, wherein recording the identifier of each memory page comprises:
  acquiring from a source physical machine a memory page associated with the write request and an attribute of the memory page associated with the write request, and
  recording an identifier of the acquired memory page corresponding to the write request in the dirty page table in response to the determination that the attribute of the memory page corresponding to the write request is readable-writable.

17. The destination physical machine according to claim 15, wherein recording the identifier of each memory page comprises:
  setting, during a live virtual machine migration processing procedure corresponding to a read request, an attribute of a memory page corresponding to the read request as read-only, wherein the attribute is acquired from a source physical machine; and
  copying the dirty memory pages corresponding to the dirty memory page identifiers in the dirty page table to the preset physical machine in response to the determination that live migration of the virtual machine has failed.

18. The destination physical machine according to claim 17, wherein the one or more processors are configured to execute the set of instructions to cause the destination physical machine to further perform:
  acquiring from the source physical machine a memory page corresponding to the write request, and
  recording an identifier of the memory page corresponding to the write request in the dirty page table in response to the determination the attribute of the acquired memory page corresponding to the write request is readable-writable.

19. The destination physical machine according to claim 18, wherein recording the identifier of each memory page comprises:
  in response to a determination that a memory page corresponding to the write request in the destination physical machine is found and an attribute of the memory page is changed from readable-writable when being acquired from the source physical machine to read-only:
    setting the attribute of the memory page in the destination physical machine corresponding to the write request as readable-writable, and
    recording an identifier of the memory page corresponding to the write request in the dirty page table.

20. The destination physical machine according to claim 11, wherein the one or more processors are configured to execute the set of instructions to cause the destination physical machine to further perform:
  monitoring, during the live migration of the virtual machine, whether a failure case occurs, the failure case being one of network transmission failure between the destination physical machine and the source physical machine, failure to create a virtual machine instance, or an operation failure of a created virtual machine instance; and
  sending a notification indicating a live virtual machine migration failure to the destination physical machine in response to a determination that a failure case has occurred.

21. A non-transitory computer readable medium that stores a set of instructions that is executable by at least one processor of a destination physical machine to cause the destination physical machine to perform a method for performing live migration of a virtual machine, the method comprising:

copying dirty memory pages corresponding to dirty memory page identifiers in a dirty page table to a preset physical machine for updating and storing the copied dirty memory pages in response to a determination that live migration of a virtual machine has failed in a delayed-copy mode.

22. The non-transitory computer readable medium of claim 21, wherein copying dirty memory pages comprises:
acquiring memory pages corresponding to the dirty memory page identifiers in the dirty page table as the dirty memory pages in response to a determination that the live migration of the virtual machine has failed.

23. The non-transitory computer readable medium of claim 21, wherein copying dirty memory pages comprises:
in response to a determination that the live migration of the virtual machine has failed, sending CPU context of the virtual machine, the dirty page table, and the dirty memory pages to a rollback physical machine for updating and storing the copied dirty memory pages.

24. The non-transitory computer readable medium of claim 21, wherein copying dirty memory pages comprises:
in response to a determination that the live migration of the virtual machine has failed, setting a migration status flag in the preset physical machine as a migration failed state.

25. The non-transitory computer readable medium of claim 21, wherein the set of instructions that is executable by the at least one processor of the destination physical machine to cause the destination physical machine to further perform:
recording, prior to copying dirty memory pages, during a live virtual machine migration procedure for a write request, an identifier of each memory page corresponding to the write request in the dirty page table in response to a determination that an attribute of the memory page corresponding to the write request is readable-writable.

26. The non-transitory computer readable medium of claim 25, wherein recording the identifier of each memory page comprises:
acquiring from a source physical machine a memory page associated with the write request and an attribute of the memory page associated with the write request, and
recording an identifier of the acquired memory page corresponding to the write request in the dirty page table in response to the determination that the attribute of the memory page corresponding to the write request is readable-writable.

27. The non-transitory computer readable medium of claim 25, wherein recording the identifier of each memory page comprises:
setting, during a live virtual machine migration processing procedure corresponding to a read request, an attribute of a memory page corresponding to the read request as read-only, wherein the attribute is acquired from a source physical machine; and
copying the dirty memory pages corresponding to the dirty memory page identifiers in the dirty page table to preset source physical machine in response to the determination that live migration of the virtual machine has failed.

28. The non-transitory computer readable medium of claim 27, wherein the set of instructions that is executable by the at least one processor of the destination physical machine to cause the destination physical machine to further perform:
acquiring from the source physical machine a memory page corresponding to the write request, and
recording an identifier of the memory page corresponding to the write request in the dirty page table in response to the determination the attribute of the acquired memory page corresponding to the write request is readable-writable.

29. The non-transitory computer readable medium of claim 28, wherein recording the identifier of each memory page comprises:
in response to a determination that a memory page corresponding to the write request in the destination physical machine is found and an attribute of the memory page is changed from readable-writable when being acquired from the source physical machine to read-only:
setting the attribute of the memory page in the destination physical machine corresponding to the write request as readable-writable, and
recording an identifier of the memory page corresponding to the write request in the dirty page table.

30. The non-transitory computer readable medium of claim 21, wherein the set of instructions that is executable by the at least one processor of the destination physical machine to cause the destination physical machine to further perform:
monitoring, during the live migration of the virtual machine, whether a failure case occurs, the failure case being one of network transmission failure between the destination physical machine and the source physical machine, failure to create a virtual machine instance, or an operation failure of a created virtual machine instance; and
sending a notification indicating a live virtual machine migration failure to the destination physical machine in response to a determination that a failure case has occurred.

* * * * *